(12) United States Patent
Dunning et al.

(10) Patent No.: US 7,574,513 B2
(45) Date of Patent: Aug. 11, 2009

(54) CONTROLLABLE TRACK-SKIPPING

(75) Inventors: Ted E Dunning, San Diego, CA (US);
Amir Doron, San Diego, CA (US);
Michael Kogan, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 680 days.

(21) Appl. No.: 10/177,643

(22) Filed: Jun. 20, 2002

(65) Prior Publication Data

US 2003/0018797 A1 Jan. 23, 2003

Related U.S. Application Data

(63) Continuation-in-part of application No. 09/846,823, filed on Apr. 30, 2001.

(51) Int. Cl.
*G06F 15/16* (2006.01)
(52) U.S. Cl. ............ 709/231; 709/217; 709/223; 709/227; 725/28; 725/115; 725/133; 386/46; 386/65
(58) Field of Classification Search .......... 709/231, 709/223, 217, 227; 725/28, 115, 133; 386/46, 386/65
See application file for complete search history.

(56) References Cited

U.S. PATENT DOCUMENTS

| 3,568,156 A | 3/1971 | Thompson |
|---|---|---|
| 4,384,329 A | 5/1983 | Rosenbaum et al. |
| 4,833,610 A | 5/1989 | Zamora |
| 5,062,143 A | 10/1991 | Schmitt |
| 5,182,708 A | 1/1993 | Ejiri |

(Continued)

FOREIGN PATENT DOCUMENTS

AU A53031/98 2/1997

(Continued)

OTHER PUBLICATIONS

Hayes, Conor et al., Smart Radio—A Proposal, Technical Report TCD-CS-1999-24, Online! Apr. 1999 , pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

(Continued)

*Primary Examiner*—J Bret Dennison
*Assistant Examiner*—Kyung H Shin
(74) *Attorney, Agent, or Firm*—James J. DeCarlo; Greenberg Traurig, LLP

(57) ABSTRACT

A method, system, and computer program product allow users to skip and/or to fast-forward through media items such as songs, while limiting the extent to which skipping is allowed in order to maintain conformance with sound performance complement restrictions such as those specified by the Digital Millennium Copyright Act. If the user requests a skip that may result in a DMCA violation, the skip is disallowed and the request is denied. Playlists are constructed so that the sound recording performance complement limitations are applied to a longer time period than the period specified in the DMCA, the longer time period being defined by adding an "excess time" to the normal DMCA period. If the user attempts to skip a song or song portion that would cause the aggregated skipped amount to exceed the excess time, the skip is disallowed.

39 Claims, 14 Drawing Sheets

U.S. PATENT DOCUMENTS

| | | | |
|---|---|---|---|
| 5,241,674 A | 8/1993 | Kuorsawa | |
| 5,303,150 A | 4/1994 | Komeda | |
| 5,303,302 A | 4/1994 | Burrows | |
| 5,371,807 A | 12/1994 | Register | |
| 5,392,212 A | 2/1995 | Geist | |
| 5,404,505 A | 4/1995 | Levinson | |
| 5,418,951 A | 5/1995 | Damashek | |
| 5,497,488 A | 3/1996 | Akizawa | |
| 5,499,046 A | 3/1996 | Schiller et al. | |
| 5,539,635 A | 7/1996 | Larson, Jr. | |
| 5,548,507 A | 8/1996 | Martino | |
| 5,583,763 A | 12/1996 | Atcheson | |
| 5,592,511 A | 1/1997 | Schoen | |
| 5,608,622 A | 3/1997 | Church | |
| 5,616,876 A | 4/1997 | Cluts | |
| 5,661,787 A | 8/1997 | Pocock | |
| 5,675,786 A | 10/1997 | McKed | |
| 5,678,054 A | 10/1997 | Shibata | |
| 5,706,365 A | 1/1998 | Rangarajan | |
| 5,708,709 A | 1/1998 | Rose | |
| 5,713,016 A | 1/1998 | Hill | |
| 5,721,827 A | 2/1998 | Logan | |
| 5,726,909 A | 3/1998 | Krikorian | |
| 5,740,134 A | 4/1998 | Peterson | |
| 5,751,672 A | 5/1998 | Yankowsky | |
| 5,754,938 A | 5/1998 | Herz | |
| 5,758,257 A | 5/1998 | Herz | |
| 5,764,235 A | 6/1998 | Hunt | |
| 5,774,357 A | 6/1998 | Hoffberg | |
| 5,790,423 A | 8/1998 | Lan et al. | |
| 5,790,935 A | 8/1998 | Payton | |
| 5,809,246 A | 9/1998 | Goldman | |
| 5,819,160 A | 10/1998 | Foladare | |
| 5,842,010 A | 11/1998 | Jain | |
| 5,862,220 A | 1/1999 | Perlman | |
| 5,862,339 A | 1/1999 | Bonnaure | |
| 5,864,868 A | 1/1999 | Contois | |
| 5,872,921 A | 2/1999 | Zahariev | |
| 5,881,234 A | 3/1999 | Schwab | |
| 5,883,986 A | 3/1999 | Kopec | |
| 5,884,312 A | 3/1999 | Dustan | |
| 5,898,833 A | 4/1999 | Kidder | |
| 5,913,040 A | 6/1999 | Rakavy | |
| 5,913,041 A | 6/1999 | Ramanathan | |
| 5,926,207 A | 7/1999 | Vaughan | |
| 5,930,526 A | 7/1999 | Iverson | |
| 5,930,768 A | 7/1999 | Hooban | |
| 5,931,907 A | 8/1999 | Davies | |
| 5,941,951 A | 8/1999 | Day | |
| 5,945,988 A | 8/1999 | Williams | |
| 5,950,189 A | 9/1999 | Cohen | |
| 5,956,482 A | 9/1999 | Agraharam | |
| 5,960,430 A | 9/1999 | Haimowitz | |
| 5,969,283 A | 10/1999 | Looney | |
| 5,977,964 A | 11/1999 | Williams | |
| 5,983,176 A | 11/1999 | Hoffert | |
| 5,987,525 A | 11/1999 | Roberts | |
| 5,996,015 A | 11/1999 | Day | |
| 6,000,008 A | 12/1999 | Simcoe | |
| 6,009,382 A | 12/1999 | Martino et al. | |
| 6,012,098 A | 1/2000 | Bayeh | |
| 6,020,883 A | 2/2000 | Herz | |
| 6,021,203 A | 2/2000 | Douceur | |
| 6,026,398 A | 2/2000 | Brown | |
| 6,026,439 A | 2/2000 | Chowdhury | |
| 6,029,195 A | 2/2000 | Herz | |
| 6,031,795 A | 2/2000 | Wehmeyer | |
| 6,031,797 A | 2/2000 | Van Ryzin | |
| 6,035,268 A | 3/2000 | Carus | |
| 6,038,527 A | 3/2000 | Renz | |
| 6,038,591 A | 3/2000 | Wolfe | |
| 6,047,251 A | 4/2000 | Pon | |
| 6,047,268 A | 4/2000 | Bartoli | |
| 6,047,320 A | 4/2000 | Tezuka | |
| 6,047,327 A | 4/2000 | Tso | |
| 6,052,717 A | 4/2000 | Reynolds | |
| 6,061,680 A | 5/2000 | Scherf | |
| 6,064,980 A | 5/2000 | Jacobi | |
| 6,065,051 A | 5/2000 | Steele | |
| 6,065,058 A | 5/2000 | Hailpern | |
| 6,070,185 A | 5/2000 | Anupam | |
| 6,085,242 A | 7/2000 | Chandra | |
| 6,097,719 A | 8/2000 | Benash | |
| 6,102,406 A | 8/2000 | Miles | |
| 6,105,022 A | 8/2000 | Takahashi | |
| 6,131,082 A | 10/2000 | Hargrave, III et al. | |
| 6,134,532 A | 10/2000 | Lazarus | |
| 6,138,142 A | 10/2000 | Linsk | |
| 6,154,773 A | 11/2000 | Roberts et al. | |
| 6,161,132 A | 12/2000 | Roberts et al. | |
| 6,161,139 A | 12/2000 | Win et al. | |
| 6,167,369 A | 12/2000 | Schulze | |
| 6,182,142 B1 | 1/2001 | Win | |
| 6,185,560 B1 | 2/2001 | Young | |
| 6,192,340 B1 | 2/2001 | Abecassis | |
| 6,205,126 B1 | 3/2001 | Moon | |
| 6,222,980 B1 * | 4/2001 | Asai et al. | 386/65 |
| 6,225,546 B1 | 5/2001 | Kraft | |
| 6,230,192 B1 | 5/2001 | Roberts | |
| 6,230,207 B1 | 5/2001 | Roberts | |
| 6,240,459 B1 | 5/2001 | Roberts | |
| 6,246,672 B1 | 6/2001 | Lumelsky | |
| 6,249,810 B1 | 6/2001 | Kiraly | |
| 6,252,988 B1 | 6/2001 | Ho | |
| 6,263,313 B1 | 7/2001 | Milsted | |
| 6,272,456 B1 | 8/2001 | de Campos | |
| 6,272,495 B1 | 8/2001 | Hetherington | |
| 6,282,548 B1 | 8/2001 | Burner | |
| 6,292,795 B1 | 9/2001 | Peters et al. | |
| 6,298,446 B1 | 10/2001 | Schreiber | |
| 6,314,421 B1 | 11/2001 | Sharnoff | |
| 6,317,761 B1 | 11/2001 | Landsman | |
| 6,321,205 B1 | 11/2001 | Eder | |
| 6,321,221 B1 | 11/2001 | Bieganski | |
| 6,330,593 B1 | 12/2001 | Roberts | |
| 6,343,317 B1 | 1/2002 | Glorikian | |
| 6,353,849 B1 | 3/2002 | Linsk | |
| 6,370,315 B1 * | 4/2002 | Mizuno | 386/46 |
| 6,370,513 B1 | 4/2002 | Kolawa | |
| 6,389,467 B1 | 5/2002 | Eyal | |
| 6,405,203 B1 | 6/2002 | Collart | |
| 6,430,539 B1 | 8/2002 | Lazarus | |
| 6,434,535 B1 | 8/2002 | Kupka | |
| 6,434,621 B1 * | 8/2002 | Pezzillo et al. | 709/231 |
| 6,438,579 B1 | 8/2002 | Hosken | |
| 6,487,598 B1 | 11/2002 | Valencia | |
| 6,490,553 B2 * | 12/2002 | Van Thong et al. | 704/211 |
| 6,505,203 B1 | 1/2003 | Levy | |
| 6,512,763 B1 | 1/2003 | DeGolia, Jr. | |
| 6,513,061 B1 | 1/2003 | Ebata | |
| 6,522,769 B1 | 2/2003 | Rhoads | |
| 6,526,411 B1 | 2/2003 | Ward | |
| 6,532,477 B1 | 3/2003 | Tang | |
| 6,535,854 B2 | 3/2003 | Buchner | |
| 6,538,996 B1 | 3/2003 | West | |
| 6,557,026 B1 | 4/2003 | Stephens, Jr. | |
| 6,560,403 B1 | 5/2003 | Tanaka | |
| 6,560,704 B2 | 5/2003 | Dieterman | |
| 6,587,127 B1 | 7/2003 | Leeke | |
| 6,611,812 B2 | 8/2003 | Hurtado | |
| 6,611,813 B1 | 8/2003 | Bratton | |
| 6,614,914 B1 | 9/2003 | Rhoads | |
| 6,615,208 B1 | 9/2003 | Behrens | |
| 6,655,963 B1 | 12/2003 | Horvitz | |

| | | | |
|---|---|---|---|
| 6,657,117 B2 | 12/2003 | Weare | |
| 6,658,151 B2 | 12/2003 | Lee | |
| 6,661,787 B1 | 12/2003 | O'Connell | |
| 6,677,894 B2 | 1/2004 | Sheynblat | |
| 6,725,446 B1 | 4/2004 | Hahn | |
| 6,741,980 B1 | 5/2004 | Langseth | |
| 6,757,740 B1 | 6/2004 | Parekh | |
| 6,807,632 B1 | 10/2004 | Carpentier | |
| 6,889,383 B1* | 5/2005 | Jarman | 725/28 |
| 6,925,441 B1 | 8/2005 | Jones, III | |
| 6,952,523 B2 | 10/2005 | Tanaka | |
| 7,028,082 B1* | 4/2006 | Rosenberg et al. | 709/223 |
| 2001/0005823 A1 | 6/2001 | Fischer | |
| 2001/0042107 A1 | 11/2001 | Palm | |
| 2001/0042109 A1 | 11/2001 | Bolas et al. | |
| 2001/0044855 A1 | 11/2001 | Vermeire | |
| 2001/0052028 A1 | 12/2001 | Roberts | |
| 2001/0055276 A1 | 12/2001 | Rogers | |
| 2002/0002039 A1 | 1/2002 | Qureshey et al. | |
| 2002/0004839 A1 | 1/2002 | Wine et al. | |
| 2002/0007418 A1 | 1/2002 | Hegde et al. | |
| 2002/0010621 A1 | 1/2002 | Bell | |
| 2002/0010714 A1 | 1/2002 | Hetherington | |
| 2002/0010789 A1 | 1/2002 | Lord | |
| 2002/0013852 A1 | 1/2002 | Janik | |
| 2002/0016839 A1 | 2/2002 | Smith | |
| 2002/0035561 A1 | 3/2002 | Archer | |
| 2002/0045717 A1 | 4/2002 | Grenda | |
| 2002/0056004 A1 | 5/2002 | Smith | |
| 2002/0065857 A1 | 5/2002 | Michalewicz | |
| 2002/0082901 A1 | 6/2002 | Dunning | |
| 2002/0095387 A1 | 7/2002 | Sosa | |
| 2002/0099696 A1 | 7/2002 | Prince | |
| 2002/0099737 A1 | 7/2002 | Porter | |
| 2002/0111912 A1 | 8/2002 | Hunter | |
| 2002/0129123 A1 | 9/2002 | Johnson | |
| 2002/0152204 A1 | 10/2002 | Ortega et al. | |
| 2002/0175941 A1 | 11/2002 | Hand | |
| 2003/0002608 A1 | 1/2003 | Glenn | |
| 2003/0007507 A1 | 1/2003 | Rajwan et al. | |
| 2003/0018797 A1* | 1/2003 | Dunning et al. | 709/231 |
| 2003/0028796 A1 | 2/2003 | Roberts | |
| 2003/0046283 A1 | 3/2003 | Roberts | |
| 2003/0083871 A1 | 5/2003 | Foote | |
| 2003/0093476 A1 | 5/2003 | Syed | |
| 2003/0133453 A1 | 7/2003 | Makishima | |
| 2003/0135513 A1 | 7/2003 | Quinn | |
| 2003/0139989 A1 | 7/2003 | Churquina | |
| 2003/0165200 A1 | 9/2003 | Pugel | |
| 2003/0182139 A1 | 9/2003 | Harris | |
| 2003/0190077 A1 | 10/2003 | Ross | |
| 2003/0206558 A1 | 11/2003 | Parkkinen | |
| 2005/0149759 A1 | 7/2005 | Vishwanath | |

FOREIGN PATENT DOCUMENTS

| | | |
|---|---|---|
| EP | 01/73639 | 5/1986 |
| EP | 0 847 156 A2 | 9/1997 |
| EP | 1010098 B1 | 4/1998 |
| EP | 1324567 A2 | 4/1998 |
| EP | 0955592 A2 | 4/1999 |
| EP | 1 050 833 A2 | 8/2000 |
| EP | 1236354 | 9/2002 |
| GB | 2306869 | 11/1995 |
| JP | 2001202368 | 7/2001 |
| JP | 2001521642 | 11/2001 |
| WO | WO 97/07467 | 2/1997 |
| WO | WO 98/25269 | 6/1998 |
| WO | WO 98/47080 | 10/1998 |
| WO | WO 99/27681 | 6/1999 |
| WO | WO 99/43111 | 8/1999 |
| WO | WO 00/46681 A1 | 2/2000 |
| WO | WO 00/31964 | 6/2000 |
| WO | WO 01/54323 A2 | 1/2001 |
| WO | WO 01/33379 A1 | 5/2001 |
| WO | WO 01/35667 A1 | 5/2001 |
| WO | WO 01/73639 A1 | 10/2001 |
| WO | WO 02/42862 A2 | 5/2002 |
| WO | WO 02/065341 A2 | 8/2002 |
| WO | WO 02/065341 A3 | 8/2002 |
| WO | WO 03/012695 A2 | 2/2003 |

OTHER PUBLICATIONS

Hoffman, Thomas et al., Latent Class Models For Collaborative Filtering, Proceedings Of The Sixteenth International Joint Conference On Artificial Intelligence, IJCAI 99, Stockholm, Sweden, Jul. 31-Aug. 6, 1999, Online! pp. 688-693, XP002279578, Retrieved from the Internet: <URL:http://www.cs.brown.edu/(th/papers/HofmannPuzicha-IJCAI99.pdf>, retrieved on May 7, 2004.

Loeb, Shoshana, Architecting Personalized Delivery Of Multimedia Information, Communications Of The ACM, vol. 25, No. 12, Dec. 1992, pp. 39-50, XP002102709.

Nichols, David M. et al., Recommendation And Usage In The Digital Library, Technical Report Ref. CSEG/2/1997, Online! 1997, pp. 1-15, XP002279577, Retrieved from the Internet: <URL:ftp://ftp.comp.lancs.ac.uk/pub/reports/1997/CSEG.2.97.pdf>, retrieved on May 7, 2004.

Schafer, J. Ben et al., Recommender Systems in E-Commerce, Proceedings ACM Conference On Electronic Commerce, 1999, pp. 158-166, XP002199598.

U.S. Appl. No. 60/144,377, filed Jul. 16, 1999, Benjamin E. Hosken.
U.S. Appl. No. 60/165,726, filed Nov. 15, 1999, Sean Michnel Ward.
U.S. Appl. No. 60/165,727, filed Nov. 15, 1999, Sean Michnel Ward.
U.S. Appl. No. 60/166,039, filed Nov. 17, 1999, Sean Michnel Ward.
Adam B. Stubblefield, et al., "A Security Analysis of My.PP3.com and the Beam-it Protocol".

Alan Griffiths, H. Claire Luckhurst and Peter Willett, "Using Interdocument Similarity Information in Document Retrieval Systems," pp. 365-373, John Wiley & Sons, Inc., 1986.

Brian P. McCune, Richard M. Tong, Jeffrey S. Dean, and Daniel G. Shapiro, "RUBRIC: A System for Rule-Based Information Retrieval," pp. 440-445.

C. J. van Rijsbergen, B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk/keith/preface.html> (213 pages).

Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.

Charu C. Aggarwal, Cecilia Procopiuc, Joel L. Wolf, Philip S. Yu, and Jong Soo Park, "Fast Algorithm for Projected Clustering;", Proceedings of the ACM SIGMOD International Conference on Management of Data, 1999.

Cyril Cleverdon, "The Cranfield Tests On Index Language Devices," presented Apr. 27, 1967, pp. 47-59, Found in: Readings in Information Retrieval, Edited by Karen Sparck Jones and Peter Willett, Morgan Kaufmann Publishers, Inc., San Francisco, CA, 1997.

Cyril W. Cleverdon and J, Mills, "The Testing Of Index Language Devices," presented Feb. 5, 1963, Chapter 3—Key Concepts, pp. 98-1 10, Found in: Readings in Information Retrieval, Edited by Karen Sparck Jones and Peter Willett, Morgan Kaufmann Publishers, Inc., San Francisco, CA, 1997.

David A. Hull and Gregory Grefenstette, "Querying Across Languages: A Dictionary-Based Approach to Multilingual Information Retrieval," pp. 484-492.

E. Michael Keen, "Presenting Results of Experimental Retrieval Comparisons," Department of Information & Library Studies, University College of Wales, Aberystwyth, Sy23 3AS U.K., pp. 217-222.

Erling Wold, Thom Blum, Douglas Keislar, and James Wheaton, "Content-Based Classification, Search, and Retrieval of Audio," IEEE MultiMedia, Fall 1996.

F.W. Lancaster, "MEDLARS: Report on the Evaluation of Its Operating Efficiency," pp. 223-246.

Gerard Salton and C. Buckley, "Term-Weighting Approaches In Automatic Text Retrieval," (accepted in final form Jan. 26, 1988), Department of Computer Science, Cornell University, Ithaca, NY.

Gerard Salton and M. E. Lesk, "Computer Evaluation Of Indexing and Text Processing," pp. 60-84, Found in: Readings in Information Retrieval, Edited by Karen Sparck Jones and Peter Willett, Morgan Kaufmann Publishers, Inc., San Francisco, CA, 1997.

Gerard Salton and M.J. McGill, "The SMART and SIRE Experimental Retrieval Systems," pp. 381-399.

Gerard Salton and Michael J. McGill, "Introduction to Modern Information Retrieval," Computer Science Series, pp. 1-435, 1983 by McGraw-Hill, Inc., McGraw-Hill Book Company, USA.

Gerard Salton, A. Wong and C.S. Yang, "A Vector Space Model for Automatic Indexing," Cornell University, pp. 273-280.

Gerard Salton, James Allan, Chris Buckley and Amit Singhal, "Automatic Analysis, Theme Generation, and Summarization of Machine-Readable Texts," pp. 478-483.

Ian Goldberg, Steven D. Gribble, David Wagner, Eric A. Brewer "The Ninja Jukebox" Oct. 14, 1999.

Ian H. Witten and Eibe Frank, "Data Mining, Practical Machine Learning Tools and Techniques with JAVA Implementations", Academic Press, pp. 57-76.

Internet Papers: Freetantrum: Songprint 1.2, and computer code; www.freetantrum.org.

Jean Tague-Sutcliffe, "The Pragmatics of Information Retrieval Experimentation Revisited," School of Library and Information Science, University of Western Ontario, Canada, pp. 205-216.

Karen Sparck Jones and Peter Willett (Editors), Chapter 3—"Key Concepts," pp. 85-92 Found in: Readings in Information Retrieval, Morgan Kaufmann Publishers, Inc., San Francisco, CA, 1997.

Karen Sparck Jones, G.J.F. Jones, J.T. Foote, and S.J. Young, "Experiments in Spoken Document Retrieval," pp. 493-502.

Karen Sparck Jones, "Search Term Relevance Weighting Given Little Relevance Information," pp. 329-338, (originally located in Journal of Documentation, vol. 35, No. 1; Mar. 1979, pp. 30-48).

Lauren B. Doyle, "Indexing and Abstracting by Association—Part 1," pp. 25-38, Santa Monica, CA, Found in: Readings in Information Retrieval, Edited by Karen Sparck Jones and Peter Willett, Morgan Kaufmann Publishers, Inc., San Francisco, CA, 1997.

Lisa F. Rau, "Conceptual Information Extraction and Retrieval from Natural Language Input," Artificial Intelligence Program GE Research and Development Center, Schenectady, NY 12301, pp. 527-533.

M. Agosti, G. Gradenigo, P.G. Marchetti, "A Hypertext Environment for Interacting with Large Textual Databases," pp. 469-477.

M. F. Porter, "An Algorithm For Suffix Stripping," Computer Laboratory, Corn Exchange Street, Cambridge, 313-316.

M.E. Maron and J.L. Kuhns, "On Relevance, Probabilistic Indexing and Information Retrieval," pp. 39-46, Found in: Readings in Information Retrieval, Edited by Karen Sparck Jones and Peter Willett, Morgan Kaufmann Publishers, Inc., San Francisco, CA, 1997.

MusicMatch Literature downloaded from web.archive.org—7 pages total.

N.J. Belkin, R.N. Oddy, H.M. Brooks, "The Journal of Documentation", pp. 299-304, vol. 38, No. 2, Jun. 1982.

RealNetworks Literature downloaded from web.archive.org—16 pages total.

R. Brody, Ph.D., "The Conditions and Consequences of Profiling in Commercial and Governmental Settings," Technology And Society, 1998. ISTAS 98. Wiring The World: The Impact Of Information Technology On Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.

S.E Robertson, "The Probability Ranking Principle In 1R," School of Library, Archive, Information Studies, University College of London, pp. 281-286.

S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, ECIV OHB, U.K., pp. 345-354.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006] *the whole document*.

Tomek Strzalkowski, "Robust Text Processing in Automated Information Retrieval," Courant Institute of Mathematical Sciences, pp. 317-322.

Unjung Nam, Lectures: "Mel-Frequency Cepstral Analysis," [online] [retrieved on Feb. 2, 2001] Retrieved from the Internet <URL:http://www.ccrma.standford.edu/~unjung/mylec/mfcc.html>, pp. 1-3.

W. B. Croft and D. J. Harper, "Using Probabilistic Models of Document Retrieval Without Relevance Information," Department of Computer & Information Science, University of Massachusetts, pp. 339-344.

W. J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones and Peter Willett, Morgan Kaufmann Publishers, Inc., San Francisco, CA, 1997.

Z. Liu, et al., "Audio Feature Extraction and Analysis for Scene Segmentation and Classification".

* cited by examiner

CONTROLLABLE TRACK-SKIPPING

CROSS-REFERENCE TO RELATED APPLICATIONS

The present application is a continuation-in-part of U.S. patent application Ser. No. 09/846,823 for "Relationship Discovery Engine," filed Apr. 30, 2001, the disclosure of which is incorporated herein by reference.

BACKGROUND OF THE INVENTION

1. Field of the Invention

The present invention is related to playback of media such as music, and more particularly to techniques for allowing user control of media playback while conforming to applicable sound recording performance complement restrictions.

2. Description of the Background Art

For purposes of clarity, in the following description the terms "sound recording," "song," and "track" are used interchangeably. "Song-skipping" or "track-skipping" refers to skipping a song in its entirety. "Fast-forwarding" or "scanning" refers to skipping a portion of a song or playing a song more rapidly than the normal speed. The general term "skipping" refers to either song-skipping or fast-forwarding.

Internet radio, or webcasting, is becoming an increasingly popular delivery mechanism for music. A user installs player software on a conventional personal computer, and can usually specify preferences as to the types of music he or she is interested in. A music server selects sound recordings in accordance with the specified preferences, and transmits the sound recordings to the player over the Internet, using standard file transmission techniques. The player software outputs the music for the user.

Internet radio providers typically license the rights to sound recordings to be provided via webcasting. Under certain conditions, such a license can be obtained under the statutory license provisions of the Digital Millennium Copyright Act (DMCA). A statutory license is a form of blanket license that allows the provider to acquire rights to broadcast a large number of sound recordings without having to obtain separate licenses from each copyright holder.

In the United States, pursuant to 17 U.S.C. §114, statutory licenses are available only if certain conditions are met. One such condition is that the provider's transmission must not exceed a "sound recording performance complement," which is defined as the transmission during any three-hour time period, on a particular channel, of not more than (A) three sound recordings from a particular album, including no more than two consecutive sound recordings from a particular album, or (B) four sound recordings by a particular artist or from a set or compilation of albums, including no more than three consecutive sound recordings by a particular artist or from a set or compilation of albums.

Many Internet radio providers use server-based software to select sound recordings to be transmitted; such software is usually specifically designed to generate a playlist in such a manner as to ensure that the sound recording performance complement is not exceeded. Thus, the algorithm for selecting sound recordings keeps track of which sound recordings have been selected, and makes sure that in any three-hour time period no more than the designated number of sound recordings from a particular album, by a particular artist, or from a set or compilation of albums, is transmitted.

Some player software programs allow users to skip unwanted songs and/or to fast-forward through a portion of a song. In response to a user clicking on an on-screen button or icon to song-skip or fast-forward, the player proceeds to the next song, skips a portion of the current song, or plays the current song more rapidly until the user releases the button.

When the user wishes to skip a song, the player may transmit a request that the music server begin transmitting the next song on the playlist. A player that periodically downloads transitory copies of songs may simply discard the copy of the currently playing song and start to play the next song.

When the user wishes to fast-forward, the player may transmit a request that the music server begin transmitting a subsequent portion of the current song; if appropriate, the player may discard the portion of the song that was skipped.

Such song-skipping and fast-forwarding functionality allows the user some flexibility in listening to webcast music. However, skipping in response to the user's requests may result in violation of the sound recording performance complement provisions of the DMCA. For example, song selection software may construct a playlist in which four Beatles songs appear during a three-hour time period, and a fifth Beatles song appears during the fourth hour; such a playlist would not normally exceed the sound recording performance complement provisions of the DMCA. However, if the user were to skip some of the intervening songs or fast-forward through them, the overall length of the playlist may be shortened so that the fifth Beatles song now falls within the three-hour time period. The playlist would then violate the sound recording performance complement requirements by including five Beatles songs within a three-hour time period.

What is needed is a system and method for enabling song-skipping and fast-forwarding (collectively referred to herein as "skipping") by users, while ensuring that the sound recording performance complement provisions of the DMCA are not violated.

SUMMARY OF THE INVENTION

The present invention provides a mechanism that allows users to skip songs and/or to fast-forward through songs, while limiting the extent to which skipping is allowed in order to maintain conformance with sound performance complement restrictions such as those specified by the DMCA. If the user requests a skip that may result in a DMCA violation, the skip is disallowed and the request is denied.

The invention determines the limit to which skipping is permitted as follows. Playlists are constructed so that the sound recording performance complement limitations are applied to a longer time period than the period specified in the DMCA (the "DMCA period", which is generally three hours). The amount by which the longer time period exceeds the DMCA period, referred to herein as "excess time," can be preset to any desired amount.

The invention keeps track of a quantity, referred to herein as "slippage," representing the amount of time that has been skipped by the user over the past X hours, where X is the length of the DMCA period. For example, X may equal three. Whenever the user skips a song or fast-forwards through a song, the invention increases slippage by the length of the skipped song or song portion. Updates to total slippage may be made incrementally, or upon the conclusion of each song, or upon conclusion of a block of songs. Once X hours have passed after the skip, slippage is reduced by the length of the skipped song or song portion; this process is referred to as "slippage expiry."

The invention is implemented by maintaining a history of the user's skipping behavior over the last X hours, and updating the slippage quantity according to the maintained history.

If the user attempts to skip a song or song portion that would cause slippage to exceed the predetermined amount of excess time, the skip is disallowed. Thus, skips that would result in potential violations of the sound recording performance complement limitations of the DMCA are avoided.

If the user attempts to fast-forward through a song, the invention may permit fast-forwarding up to a point limited by the current slippage value, or alternatively the invention may disallow fast-forwarding entirely for a particular song whenever skipping the entire song would cause the maximum slippage to be exceeded.

In an alternative embodiment, songs are collected into blocks, and slippage is computed and updated on a block-by-block basis. The invention determines the total allowable amount of skipping at the beginning of the block, and skipping is enabled only for the songs in the block whose cumulative duration is less than the allowable amount of skipping. The amount of skipping done during the playing of the block can be computed by comparing the elapsed time it takes to play the block to the total length of all of the songs in the block. The degree to which the elapsed time is less than the total length of the songs in the block is the total amount of skipping that took place during the block.

For a block-oriented approach, if the skipping action is recorded as occurring at the time that the end of listening to the block is noted, then the limitations on user action are, in general, more conservative than would be incurred if the skipping is recorded at the time that it was actually done. This conservatism arises because some skipping is recorded at a later time than when it was actually done; thus, that skipping is generally kept in the history longer than is necessary, increasing the estimate of the skipping that the user has done and thus restricting skipping more than is strictly necessary. Similarly, if available skip time is computed at the beginning of a block, conservatism may also result, since a worst-case analysis requires that skipping is assumed to take place as early as possible within the block. However, despite these limitations, a block-oriented approach may be desirable in order to avoid excess complexity and processing time in determining total slippage.

In an alternative embodiment, actual and theoretical start times for songs can be retained. The difference between actual and theoretical start time for a song represents the total amount of slippage accumulated up to the beginning of that song. The difference between the accumulated slippage at a current point in time and the accumulated slippage at some previous point in time indicates the amount of slippage that has occurred in the intervening time period. According to this embodiment, theoretical start times can be computed by successively adding the lengths of each song to be played. Then, a history of actual start times, extending back as far as desired, can be maintained for each listener. Slippage over a given time period is determined based on how much the difference between theoretical and actual times has changed over the time period. Thus, no explicit expiration of slippage values need be done. Rather, the invention can simply discard start times that are older than the expiration period. This expiration period can correspond to the length of the DMCA period, as described above.

Limits on skipping may be implemented at the server or at the client. In one embodiment, the server can provide the client with an estimate of how much skipping is permitted for a block or a song, and the client can be responsible for disallowing skipping when the limit has been reached.

BRIEF DESCRIPTION OF THE DRAWINGS

The FIGURES depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF A PREFERRED EMBODIMENT

The following description of system components and operation is merely exemplary of one embodiment of the present invention.

For illustrative purposes, the following description and examples describe the operation of the invention with respect to the particular sound recording performance complement provisions of the DMCA that specify that no more than four sound recordings by a particular artist be transmitted during a three-hour time period. However, one skilled in the art will recognize that the same principles and methods can be applied to other sound recording performance complement provisions of the DMCA or other restrictions imposed for legal or other reasons. For example, the technique of the present invention can be applied to limit the number of recordings from a particular album or set or compilation of albums, the number of consecutive recordings from a particular album, the number of consecutive recordings by a particular artist, and the like. Furthermore, the three-hour time period specified by the DMCA is merely an example, and any time period can be used. Finally, the techniques of the present invention can be applied to songs, song segments, video programs, radio programs, or any other type of transmissions.

System

Figure 3:
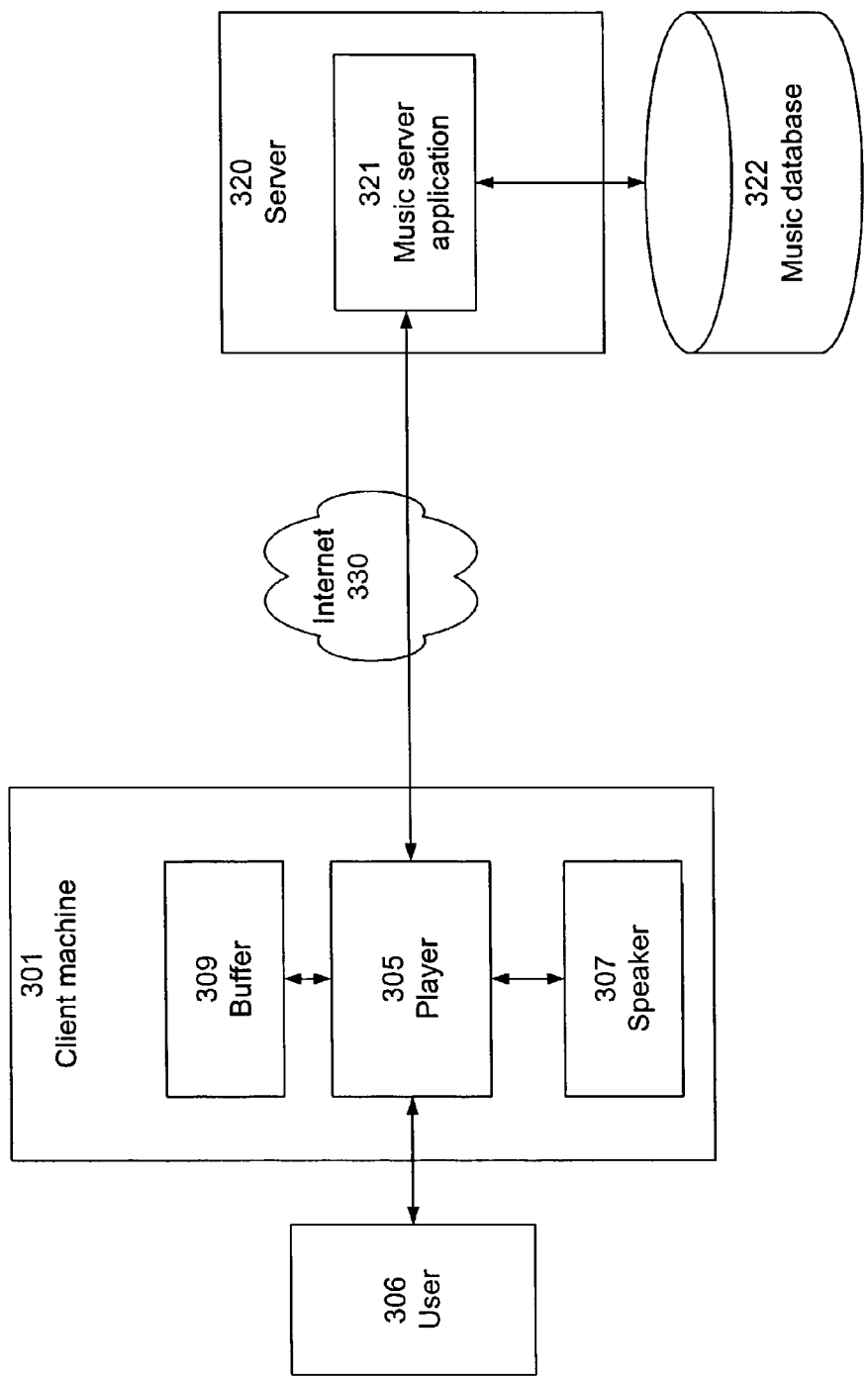
FIG. 3 is a block diagram showing a system for practicing the present invention.

Referring now to FIG. 3, there is shown a system for practicing the present invention according to one embodiment. Client machine 301 may be implemented as a conventional personal computer running an operating system such as, for example, Microsoft Windows XP, available from Microsoft Corporation. Player 305 receives music in digital form from music server application 321, via the Internet 330.

Player 305 may be implemented as a software program that runs on client machine 301. Player 305 may be a stand-alone software application, or a plug-in for a larger application such as a browser. User 306 interacts with player 305 via a graphical user interface that provides buttons, menus, icons, and the like for controlling the operation of player 305. In particular, user 306 can activate and deactivate player 305, control the volume of output, pause, skip tracks or songs, and/or fast-forward. Some of these functions may be selectively limited or disabled according to the techniques of the present invention, as will be described in more detail below. Player 305 may also provide various configuration options to allow user 306 to select the appearance of the graphical user interface, the type of music played, and the like.

In one embodiment, music data is temporarily stored in buffer 309 when it is received from application 321. Player 305 reads music data from buffer 309 as it is needed. Buffer 309 may be implemented in random access memory of client machine 301, or in secondary storage such as a hard drive. The use, management, and operation of buffer 309 for purposes of implementing streaming audio are well known in the art.

In one embodiment, music server application 321 runs on a remote server 320 and responds to requests for music received from player 305 (as well as from other players on other machines). Application 321 obtains digital music data from database 322 and transmits the music data across the Internet 330 to player 305. In one embodiment, for each song it plays, player 305 obtains metadata including, for example, song title, artist, song length, album, and the like. Such information may be provided by application 321 from information in database 322, or it may be entered by user 306, or it may be obtained by other means. Metadata may be used for implementing sound performance complement limitations according to the techniques of the present invention; for example, player 305 may allow or deny a requested song skip based on the length of the song, as determined from the metadata for the song.

In one embodiment, player 305 includes controls that allow user 306 to skip unwanted songs or to fast-forward through a portion of a song. For example, user 306 can click on an on-screen button or icon to song-skip or fast-forward, causing player 305 to proceed to the next song in a playlist, or to skip a portion of the current song, or to play the current song more rapidly until user 306 releases the button. When user 306 indicates that he or she wishes to skip a song or fast-forward, player 305 may transmit a request that server 320 begin transmitting subsequently needed song data, or, if data is already available in buffer 309, player 305 interacts with buffer 309 and instructs buffer 309 to discard skipped songs or portions as appropriate.

In one embodiment, the present invention is implemented as a mechanism for disallowing skipping under certain circumstances as will be described in more detail below. The invention can therefore be implemented at either client machine 301 or server 320. If the present invention is implemented at client machine 301, certain buttons or icons on player 305 may disappear, or their appearance may change, to indicate that skipping is limited or disallowed at a given time. Attempts to activate skipping at such times will be ignored by player 305. If the invention is implemented at server 320, requests for skips are still transmitted from player 305 to server 320, but application 321 ignores the received requests when it is appropriate to do so.

Sound Recording Performance Complement Limitations

Under certain circumstances, skipping songs or fast-forwarding through portions of songs may result in violation of the sound recording performance complement provisions of the DMCA. For example, if four Beatles songs appear in a playlist that is normally played during a three-hour time period, and a fifth Beatles song appears during the fourth hour, the sound recording performance complement would not be exceeded. However, if the user skips some of the intervening songs or fast-forwards through them, the overall length of the playlist may be shortened so that the fifth Beatles song now falls within the three-hour time period. The playlist would then violate the sound recording performance complement requirements by including five Beatles songs within a three-hour time period.

Figure 1A:
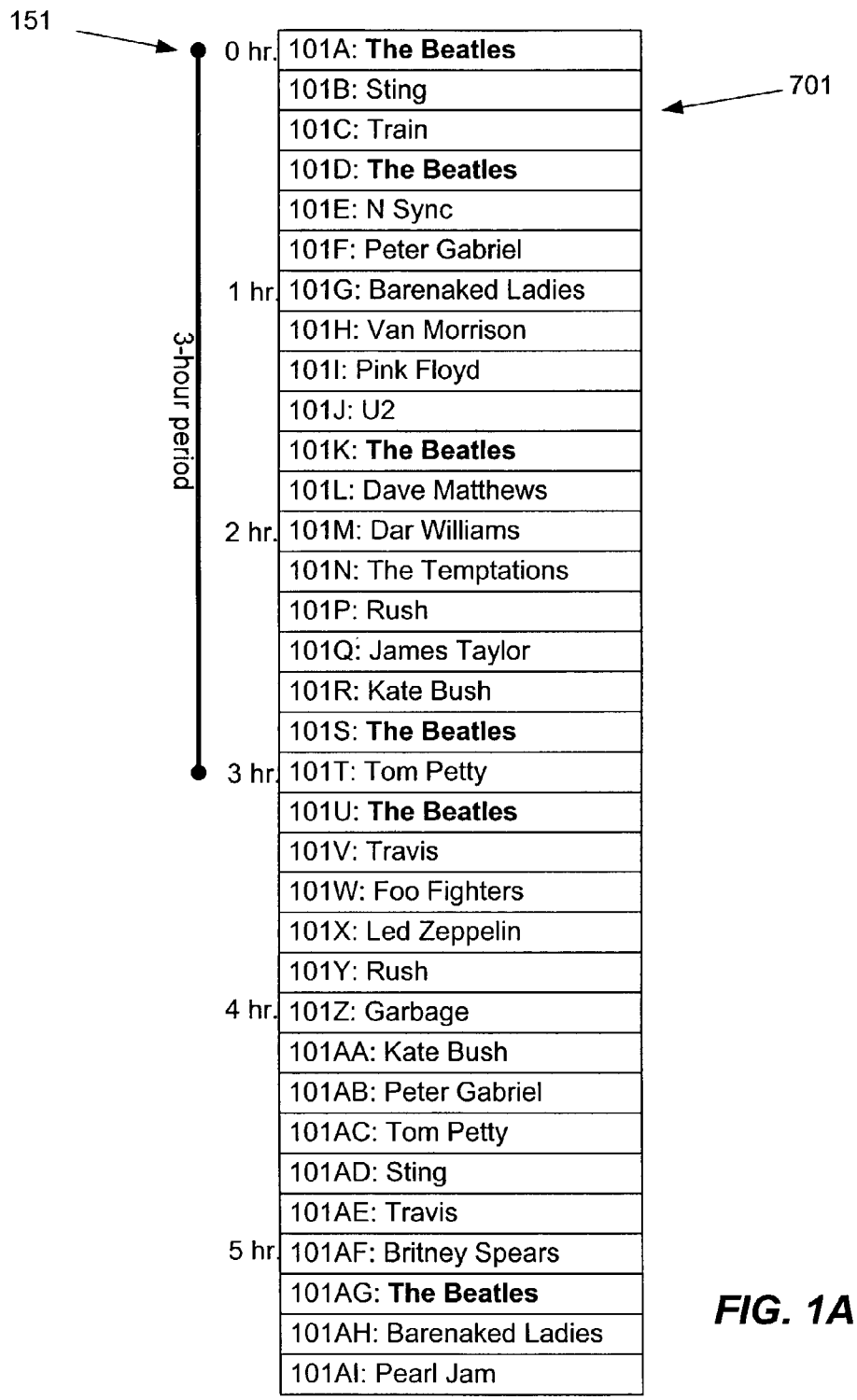
FIG. 1A depicts a playlist that conforms to the sound recording complement limitations of the DMCA.
Figure 1B:
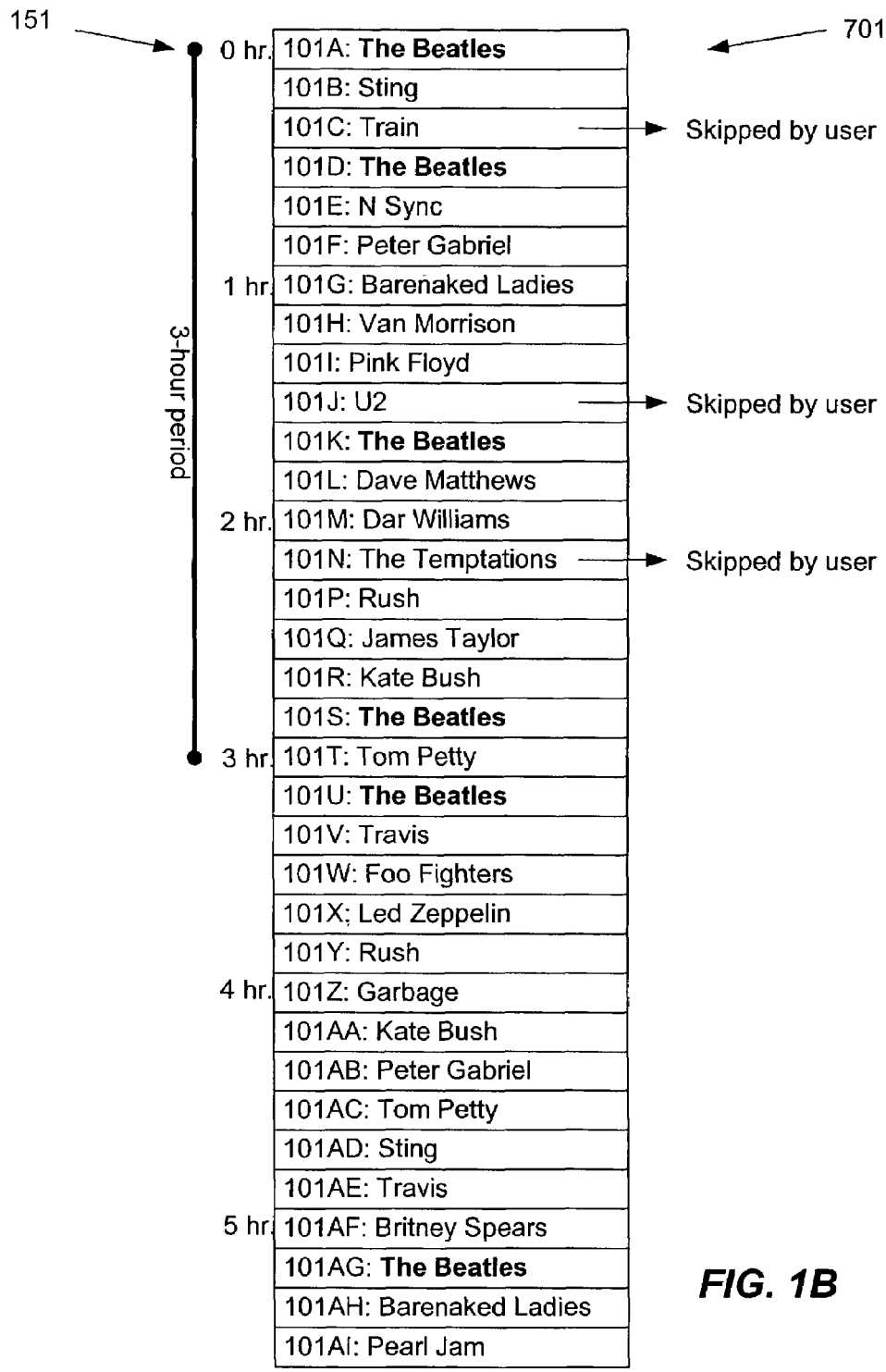
FIG. 1B depicts the playlist of FIG. 1A, denoting songs skipped by the user.
Figure 1C:
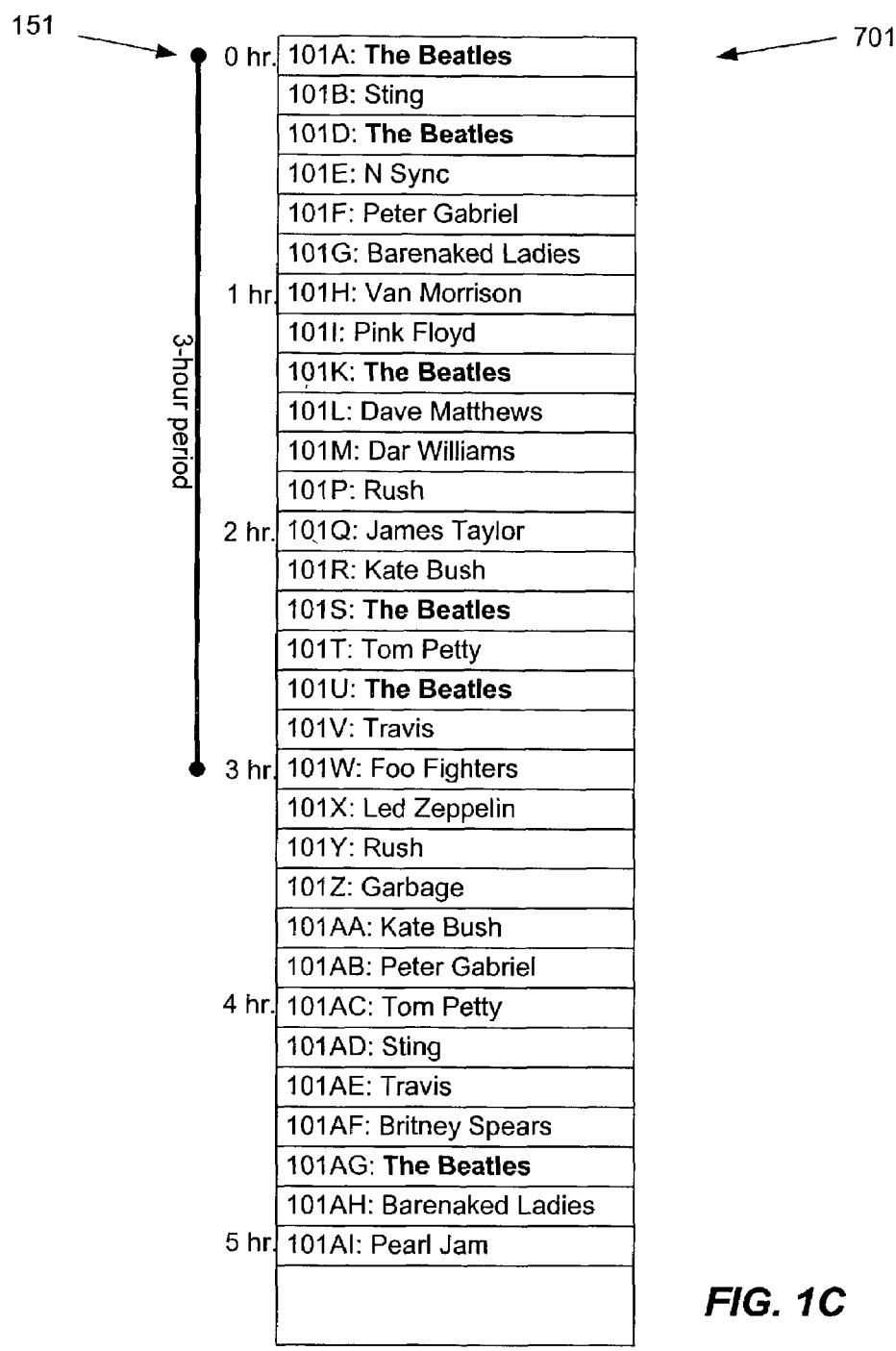
FIG. 1C depicts the playlist of FIG. 1A, omitting songs skipped by the user and illustrating a resulting violation of the sound recording complement limitations of the DMCA.

FIGS. 1A through 1C illustrate an example in which the user's decision to skip songs in a playlist results in such a violation of the sound recording performance complement limitations of the DMCA. Specifically, by skipping songs, the period of time in which repetitions occur is shortened, so that an impermissible number of repetitions take place in too short a time window.

For illustrative purposes, the following discussion and accompanying FIGURES refer to the sound recording performance complement limitations of the DMCA that prohibit transmission of more than four sound recordings by a particular artist during a three-hour time period. Similar principles and techniques can be applied to the DMCA limitations of the number of recordings from a particular album, or for any other similar types of limitations.

Referring now to FIG. 1A, there is shown an example of a series of songs 101, making up playlist 701 that initially conforms to the sound recording performance complement limitations of the DMCA. No artist is transmitted more than four times during any three-hour period, including for example period 151. In particular, it is noted that four Beatles songs 101A, 101D, 101K, and 101S appear during period 151; this transmission of four songs by a single artist is within the DMCA limit (assuming the four songs are not from the same album). The fifth Beatles song 101U lies outside the three-hour period 151 and therefore does not violate the DMCA limit.

Referring now to FIG. 1B, there is shown playlist 701 similar to that of FIG. 1A, with indicators showing that the user has elected to skip songs 101C, 101J, and 101N.

Referring now to FIG. 1C, there is shown playlist 701 similar to that of FIG. 1A, omitting songs 101C, 101J, and 101N that have been skipped by the user. The resulting playlist 701 contains five Beatles songs 101A, 101D, 101K, 101S, and 101U. Specifically, song 101U is now played within three-hour period 151, causing a violation of the DMCA limit. Thus, it can be seen that allowing the user to skip songs without restriction can result in violations of the sound performance complement limitations of the DMCA.

The present invention provides a mechanism that allows user 306 to skip songs or to fast-forward through songs, but only to a limited extent. If the user requests a skip that may result in a DMCA violation, the skip is disallowed and the request is ignored.

The invention determines the limit to which skipping is permitted by constructing playlists 701 in such a manner that the sound recording performance complement limitations are applied to a longer time period than the DMCA period. The amount by which the longer time period exceeds the DMCA period, referred to herein as "excess time," can be preset to any desired amount. In the examples shown herein, the DMCA period is three hours, and the excess time period is two hours, although one skilled in the art will recognize that any time period may be used.

In one embodiment, client machine 301 keeps track of "slippage," representing the amount of time that has been skipped by user 306 over the past X hours, where X is the length of the DMCA period. Whenever user 306 skips a song or fast-forwards through a song, client 301 increases slippage by the length of the skipped song or song portion. In one embodiment, the increase in slippage is determined by subtracting the amount of time taken to perform the skip from the amount of time skipped. Thus, if two minutes (2:00) of music were skipped in five seconds (0:05), slippage would be increased by one minute and fifty-five seconds (1:55). Updates to total slippage may be made incrementally or upon the conclusion of each song. Once X hours have passed after the skip, slippage is reduced by the length of the skipped song or song portion (slippage expiry).

If user 306 attempts to skip a song or song portion that would cause slippage to exceed the predetermined amount of excess time, the skip is disallowed. Thus, skips that would result in potential violations of the sound recording performance complement limitations of the DMCA are avoided.

The invention is implemented by maintaining, at client machine 301, a history of the user's skipping behavior over the last X hours, and updating the slippage quantity according to the maintained history. In an alternative embodiment, server 320, rather than client machine 301, keeps track of slippage and disallows skips when appropriate to do so.

Figure 2A:
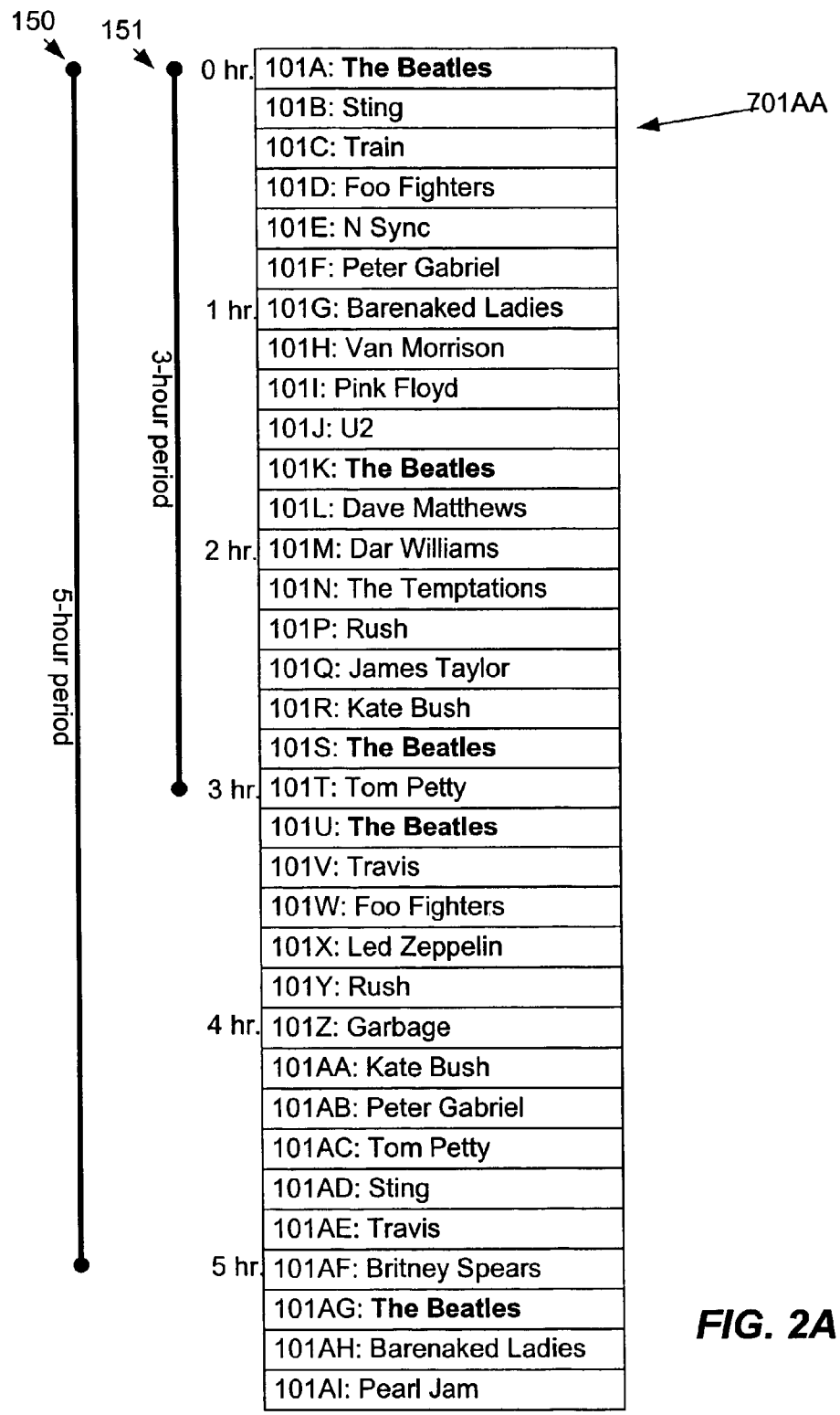
FIG. 2A depicts a playlist allowing for two hours of slippage.

Referring now to FIG. 2A, there is shown a playlist 701AA that allows for two hours of cumulative skipping. Playlist 701AA includes four Beatles songs within five-hour period 150, so that even if the user skips two hours of material, no more than four Beatles songs will appear within three-hour period 151. Thus, conformance to the limitations of the DMCA is assured, as long as skipping is limited to a maximum of two hours within any real-time window of three hours.

Figure 2B:
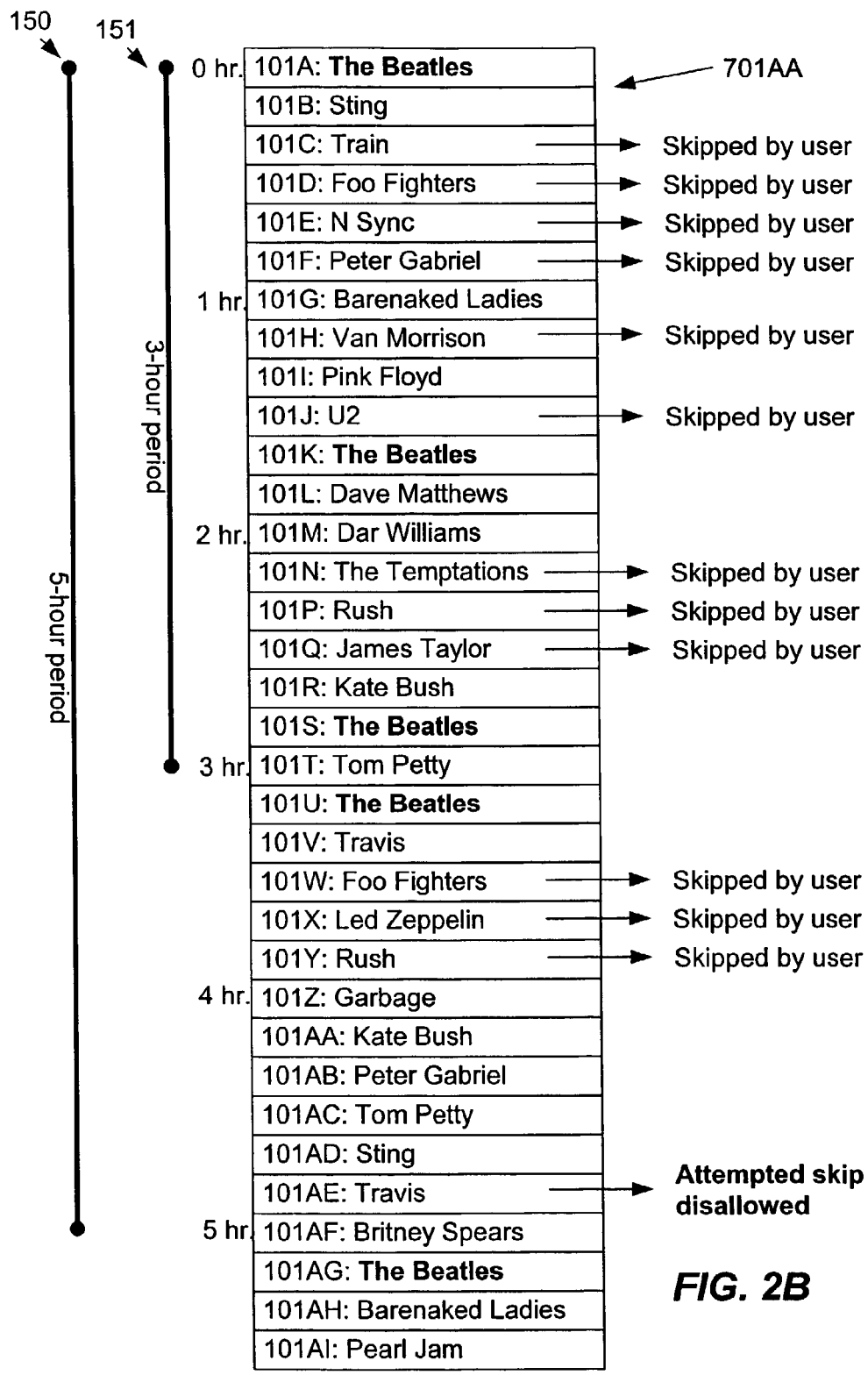
FIG. 2B depicts the playlist of FIG. 2A, denoting songs skipped by the user within slippage limits and further denoting a disallowed attempted song skip that would exceed slippage limits.

Referring now to FIG. 2B, there is shown playlist 701AA similar to that of FIG. 2A, with indicators showing that the user has elected to skip several songs. The attempted skip of song 101AE is disallowed, according to techniques of the present invention that will be described in more detail below. Were the skip permitted, song 101AG would fall within three-hour period 151, which would violate the DMCA. Thus, by disallowing the skip of song 101AE, the invention ensures that the maximum slippage is not exceeded, and that the sound performance complement limitations of the DMCA are not violated.

Figure 2C:
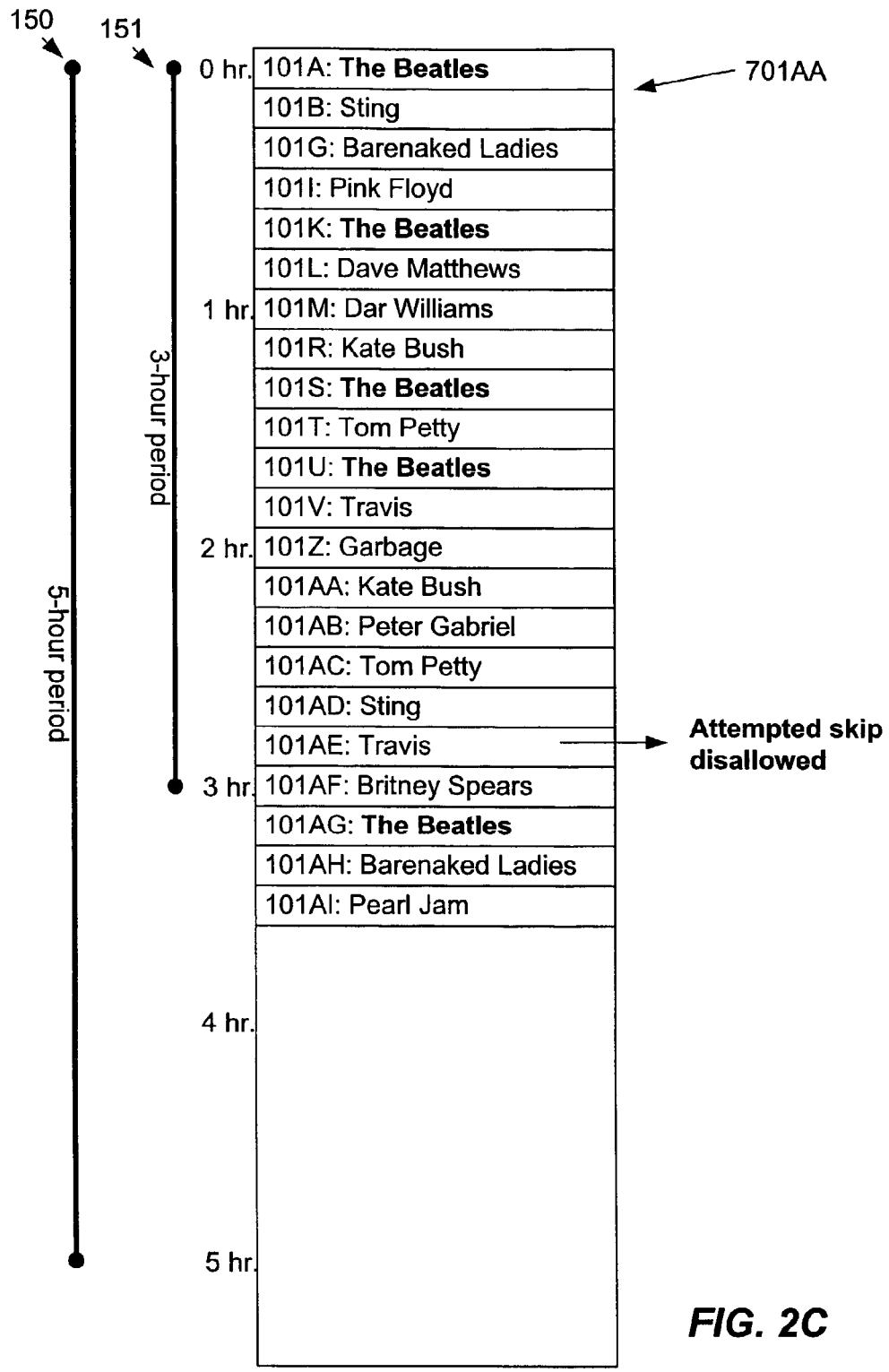
FIG. 2C depicts the playlist of FIG. 2A, omitting songs skipped by the user as in FIG. 2B, further denoting a disallowed attempted song skip that would exceed slippage limits, and illustrating conformance with the sound recording complement limitations of the DMCA.

Referring now to FIG. 2C, there is shown playlist 701AA similar to that of FIG. 2A, omitting the songs skipped in FIG. 2B. The resulting playlist 701 contains five Beatles songs 101A, 101K, 101S, 101U, and 101AG. But, since one of these songs 101AG still falls outside the three-hour period 151, the sound performance complement limitations of the DMCA are not violated. FIG. 2C further shows that song 101AG is just outside three-hour period, so that if the skip of song 101AE were permitted, song 101AG would fall within three-hour period 151. Thus, it can be seen that selectively disallowing skips according to the present invention avoids violations of the DMCA.

Method

Figure 4:
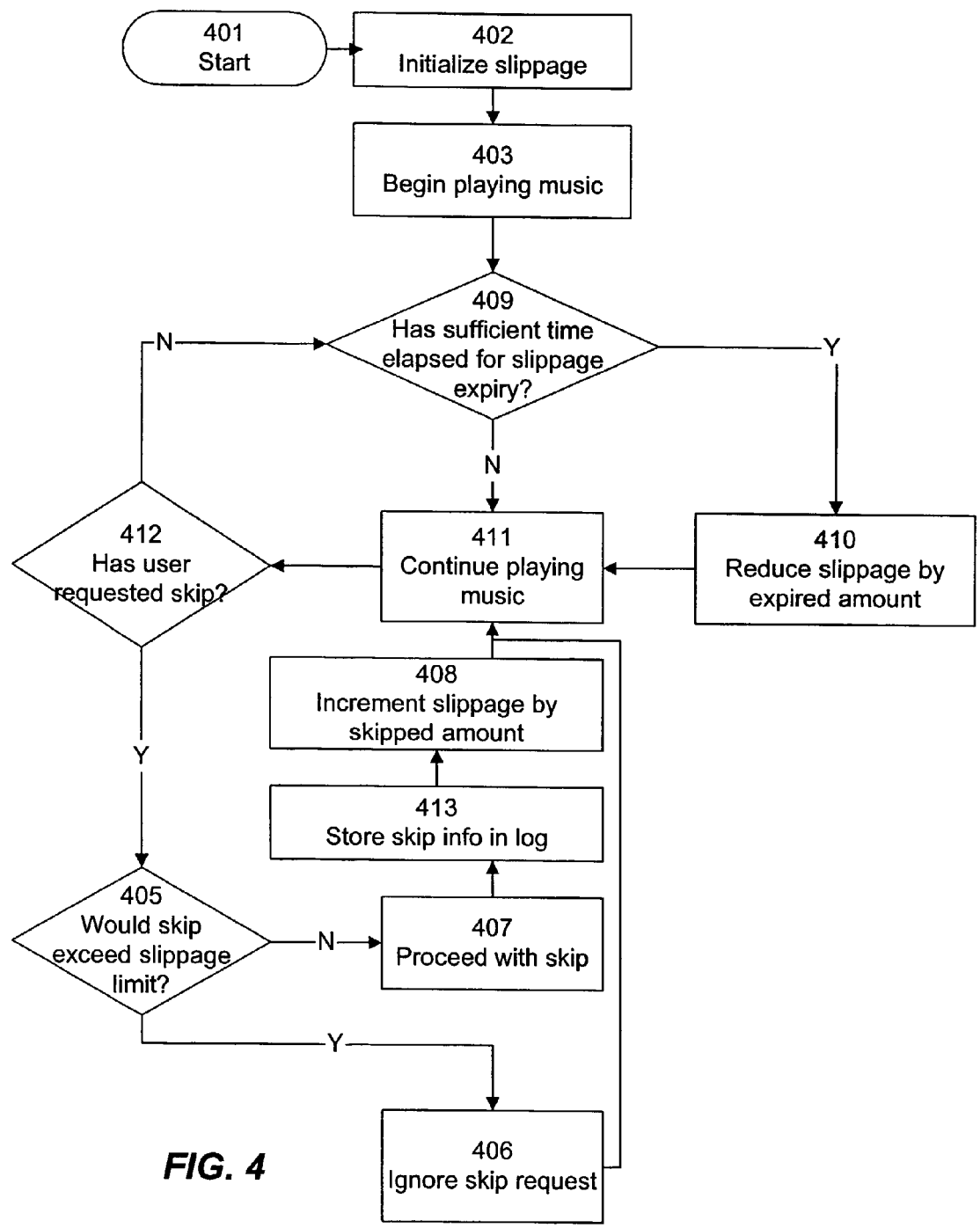
FIG. 4 is a flow chart showing a method of practicing the present invention.

Referring now to FIG. 4, there is shown a method of practicing the present invention. In one embodiment, the steps of FIG. 4 are performed by player 305, although in other embodiments other components may perform some or all of the indicated steps.

A slippage amount is initialized 402. Typically, at the beginning of a music program, slippage is initialized to zero. Slippage may be stored in any convenient memory location for easy access and updating when appropriate.

Player 305 begins 403 playing music. This step may include making requests to application 321 on server 320 as needed to obtain music data, and receiving music data across the Internet 330. Music may be temporarily stored in buffer 309, according to well-known techniques.

As music is playing, player 305 periodically checks 409 whether sufficient time has elapsed for previously added slippage to expire. In one embodiment, this determination 409 is only made if the current slippage amount is non-zero. Determination 409 is made, for example, by referring to a stored log of previous skips, to determine whether any of the previous skips occurred at a time sufficiently far in the past. If sufficient time has elapsed for slippage to expire, player 305 reduces 410 the slippage amount by the expired amount.

Whether or not any slippage has expired, player 305 continues 411 to play music. If user 306 requests 412 a skip, player 305 determines 405 whether the skip would exceed the slippage limit. Determination 405 is made by ascertaining whether the sum of the amount of music to be skipped and the current slippage amount exceed the slippage limit. If the limit would be exceeded, player 305 ignores 406 the skip request. In one embodiment, when a skip is disallowed, an on-screen message is displayed to inform user 306 that the skip is not permitted.

If the limit would not be exceeded, player 305 proceeds 407 with the skip, advancing music play as requested and communicating with application 321 as needed to obtain additional music data. Player 305 stores 413 information describing the amount of the skip and the time the skip occurred, so that it can later determine when the slippage associated with the skip should expire. Player 305 increases 408 the slippage amount by the skipped amount.

Implementation

In one embodiment, the skip limitations of the present invention are enforced as follows. Player 305 stores, in RAM or in secondary storage, a history of skips that have been requested and executed. The history is kept for at least a period of time equal to the DMCA period. For each skip, player 305 stores the time that the skip took place and the amount of music that was skipped. As described above, the latter quantity may be reduced by the amount of actual time taken to perform the skip. Alternatively, start times and lengths, or actual and theoretical start times, may be stored. One skilled in the art will recognize that such alternatives are mathematically equivalent, and that other equivalent alternatives could also be used.

Player 305 can also keep track of a current slippage value, or it can compute this number at any time by adding the amounts for all skips that took place within a window of time defined by the DMCA period. This sum can be determined, for example, at the beginning of each song to determine whether or not to allow skipping during that song. In one embodiment, player 305 disables skipping for any part of a song whenever skipping the entire song would cause a violation of the sound recording complement. Such a restriction may be stricter than necessary under DMCA provisions, but in some embodiments may be easier to implement than performing real-time assessment of whether and how much skipping is permitted.

Figure 5:
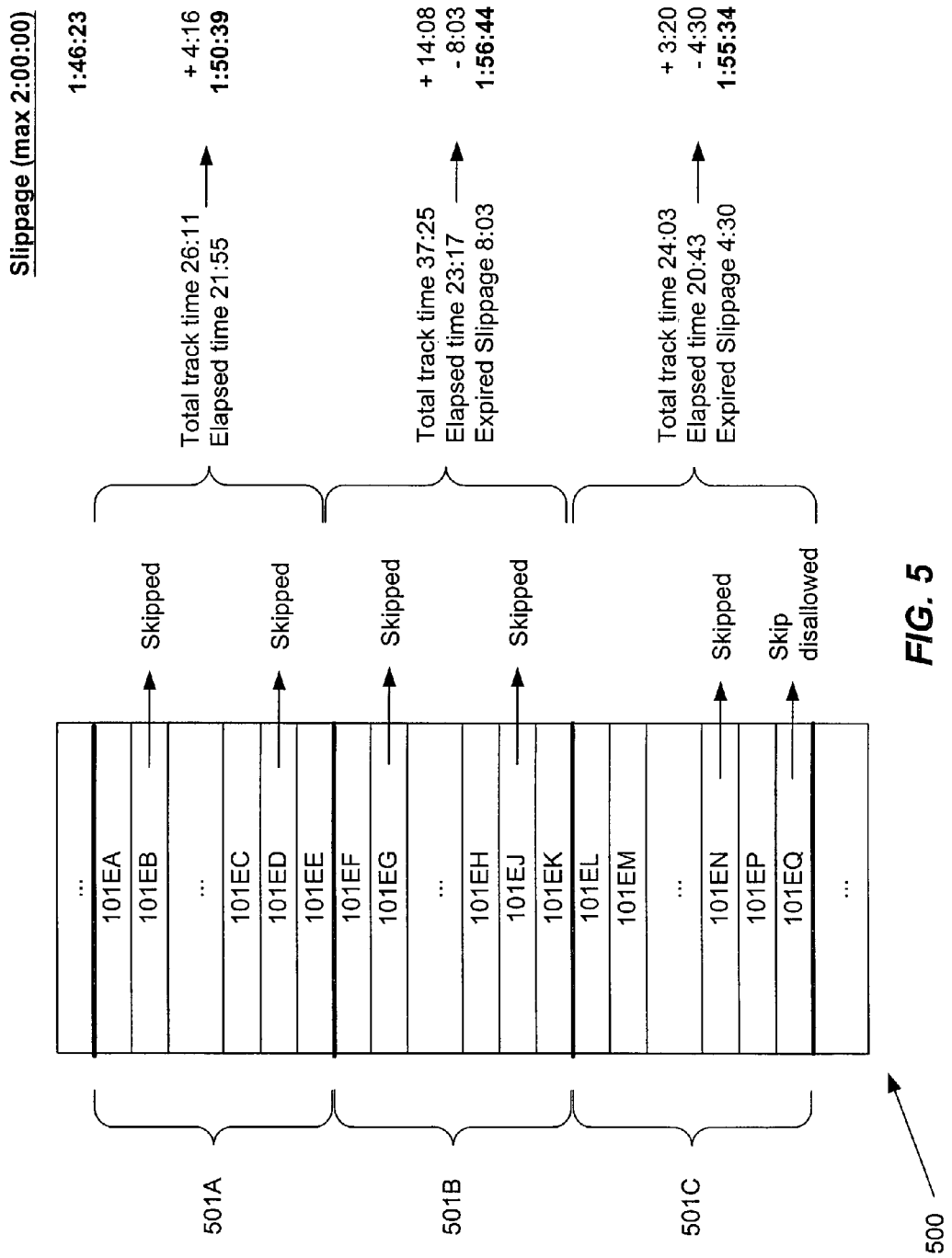
FIG. 5 depicts an example of tracking slippage for a sequence of blocks containing songs, in response to the user skipping songs.
Figure 6:
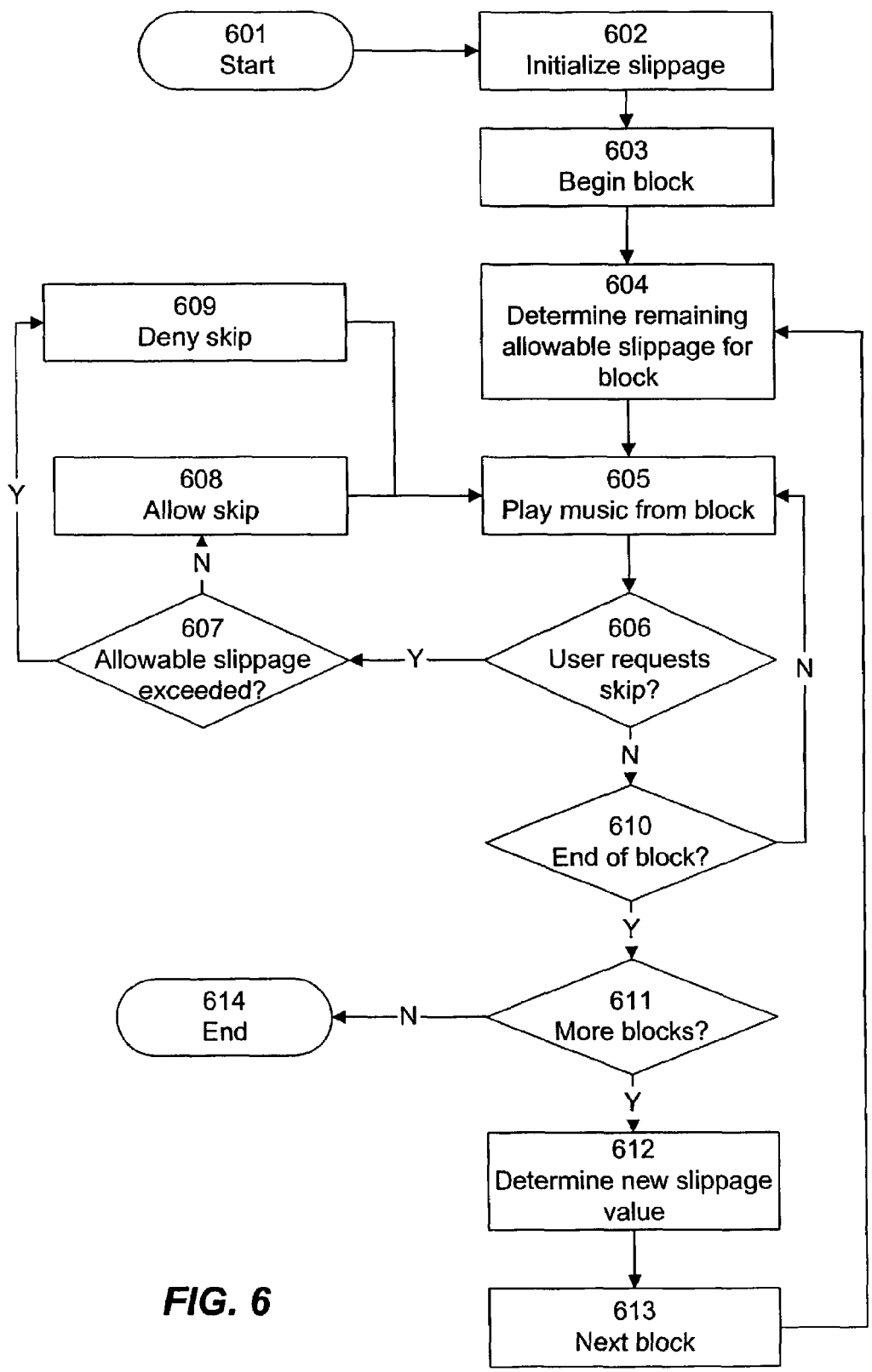
FIG. 6 is a flow chart for a block-based method of practicing the present invention.

In an alternative embodiment, songs are grouped into blocks, each containing one or more songs. Referring now to FIG. 6, there is shown a flow chart for a block-based method of practicing the present invention. Referring also to FIG. 5, there is shown an example of tracking slippage for a sequence of blocks 501 containing songs 101, in response to the user skipping songs.

Slippage value is initialized 602, typically to a value of 0:00:00, before any songs 101 are played. Player 305 begins 603 block 501. Player 305 determines 604 the allowable amount of skipping for current block 501 based on the current slippage value at the beginning of the block. For example, as shown in FIG. 5, if the maximum slippage is 2:00:00, and the current slippage value is 1:46:23 (since FIG. 5 assumes that some playback and skipping has already taken place before block 501A begins), the allowable amount of skipping for block 501A would be 2:00:00−1:46:23=0:13:37.

As player 305 plays music 605 from block 501, it detects user requests 606 for skips. Player 305 determines 607 whether the requested skip would exceed the remaining allowable slippage. If the allowable slippage would be exceeded, player 305 denies 609 the skip (or in an alternative embodiment, allows a portion of the skip corresponding to the remaining allowable slippage, but denies the remainder of the skip). If the allowable slippage would not be exceeded, player 305 allows 608 the skip.

In the example of FIG. 5, the user requests skips of songs 101EB and 101ED; both skips are allowed, since they do not exceed the allowable slippage.

In one embodiment, the current slippage amount is increased whenever a skip is allowed. In another embodiment, when the end of block 501 is reached 610, if new blocks are to be played 611, player 305 determines 612 a new slippage value as follows. The total elapsed time to play block 501 (determined by a real-time counter, or by comparing the start time with the end time for block playback) is subtracted from the total track time for the songs in block 501 (determined by summing song lengths for songs 101 in block 501); the result is the amount skipped during block 501. This amount is added to the current slippage value. Any expired slippage (slippage that took place sufficiently long ago to be outside the DMCA window, such as three hours) is subtracted from the current slippage value. Player 305 then proceeds 613 with the next block 501.

In the example of FIG. 5, block 501A has a total track time of 0:26:11, whereas the elapsed time to play block 501A was 0:21:55. Thus, player 305 determines that a total of 0:04:16 was skipped during block 501A. This amount of time is added to the slippage value of 1:46:23, for a current slippage value of 1:50:39 at the end of block 501A.

Block 501B has a total track time of 0:37:25, whereas the elapsed time to play block 501B was 0:23:17. Thus, player 305 determines that a total of 0:14:08 was skipped during block 501B. This amount of time is added to the slippage value of 1:50:39. Player 305 also determines that 0:08:03 of slippage has expired, and subtracts this amount from the slippage value. The net result is a current slippage value of 1:56:44 at the end of block 501B.

In Block 501C, the user attempts two skips. The skip of song 101EN is allowed, because it does not cause the slippage value to exceed the limit of 2:00:00. However the skip of song 101EQ is disallowed, because it would result in excess slippage. Once block 501C has ended, player 305 determines, a new slippage value, as follows. Block 501C has a total track time of 0:24:03, whereas the elapsed time to play block 501C was 0:20:43. Thus, player 305 determines that a total of 0:03:20 was skipped during block 501C (the disallowed skip is not included in this total). This amount of time is added to the slippage value of 1:56:44. Player 305 also determines that 0:04:30 of slippage has expired, and subtracts this amount from the slippage value. The net result is a current slippage value of 1:55:34 at the end of block 501C.

In one embodiment, skipping is permitted only for the songs in a block whose cumulative duration is less than the allowable amount of skipping. The amount of skipping that was done during the playing of the block is determined by comparing the elapsed time required to play the block to the total length of all of the songs in the block. The degree to which the elapsed time is less than the total length of the songs in the block is the total amount of skipping done during the block. Player 305 adjusts the slippage value (increasing it when songs are skipped and decreasing it once the DMCA period passes since the increase), at the end of each block.

In one embodiment, player 305 records any skipping during the block as having occurred at the time that the block ends. When such a technique is used, the limitations on user action are in general more conservative than they would be if skipping were recorded in real-time. This conservatism arises because some skipping is recorded at a later time than the time at which it actually takes place; expiry of the skipping history may therefore take place later than it otherwise would be. Accordingly such a technique increases the estimate of the skipping that the user has done and thus restricts the availability of the skip feature more than is strictly necessary. However, in some applications, such a methodology may be advantageous because of the reduced overhead associated with updating slippage values at the end of blocks rather than in real-time.

In another embodiment, a modified block-oriented approach is used. As described above, songs are grouped into blocks, each containing one or more songs. As user 306 skips songs or song portions during a block, player 305 accumulates an amount corresponding to the skipped amount. If skipping exceeds or equals the permissible amount for that block, then skipping is disallowed for the remainder of the block. Such a technique allows user 306 to skip more songs than would be allowed in the previously described block implementation, without violating the sound performance complement provisions of the DMCA.

In another embodiment, the above-described block-oriented approach is modified so that player 305 estimates, based on past behavior, how many of the songs in a block that user 306 is likely to skip. If it is unlikely that the user would skip more songs than are allowable, then player 305 can allow skipping for all of the songs in the block on the theory that the user is unlikely to skip so many songs in the block as to actually reach the limit. Using such a technique, although sound performance complement limitations are not strictly enforced, violations can be made very rare.

In another embodiment, the above-described block-oriented approach is modified as follows. Player 305 reports times of the skipping events that occur within the block when the next block is requested. Thus, individual skipping events are recorded in the history at very nearly the time that they actually occurred. Such a technique allows the discarding of events from the history (due to expiry of the slippage value) to be performed on a more accurate, less conservative basis, without increasing the likelihood of a violation of the sound performance complement provisions of the DMCA.

In yet, another embodiment, player 305 is given an estimate of how much skipping is to be allowed within the block and can disable the skip button when this limit is reached. This system has the virtue that the degree of conservatism is limited so that the user is allowed to skip as much as possible (although still subject to the limitations resulting from determining allowable skipping at the beginning of each block), while still strictly conforming to the sound performance complement limitations of the DMCA. Such an alternative can be combined with the reporting of the timing of each skip event to the server so that the skipping allowable at the beginning of each block can be computed accurately.

The present invention can limit the potential for fraud by enforcing skip limitations at server 320 rather than at player 305. Server 320 can note when excess skipping is occurring by noting when new songs or blocks are requested. Once a listener is noted to have consistently requested songs or blocks at a higher than possible rate, server 320 can refuse to honor requests from that user.

In another embodiment, if a playlist includes tracks that may be skipped (skippable tracks) as well as tracks that, if skipped, would result in violations of sound recording performance complement violations (non-skippable tracks), server 320 does not transmit the entire playlist to player 305. Rather, server 320 transmits only a subset of the playlist, so that all tracks in the playlist are skippable or non-skippable. In this manner, the system of the invention avoids the need to make assumptions as to which tracks in a playlist the user may or may not skip in the playlist.

EXAMPLE

Figure 7A:
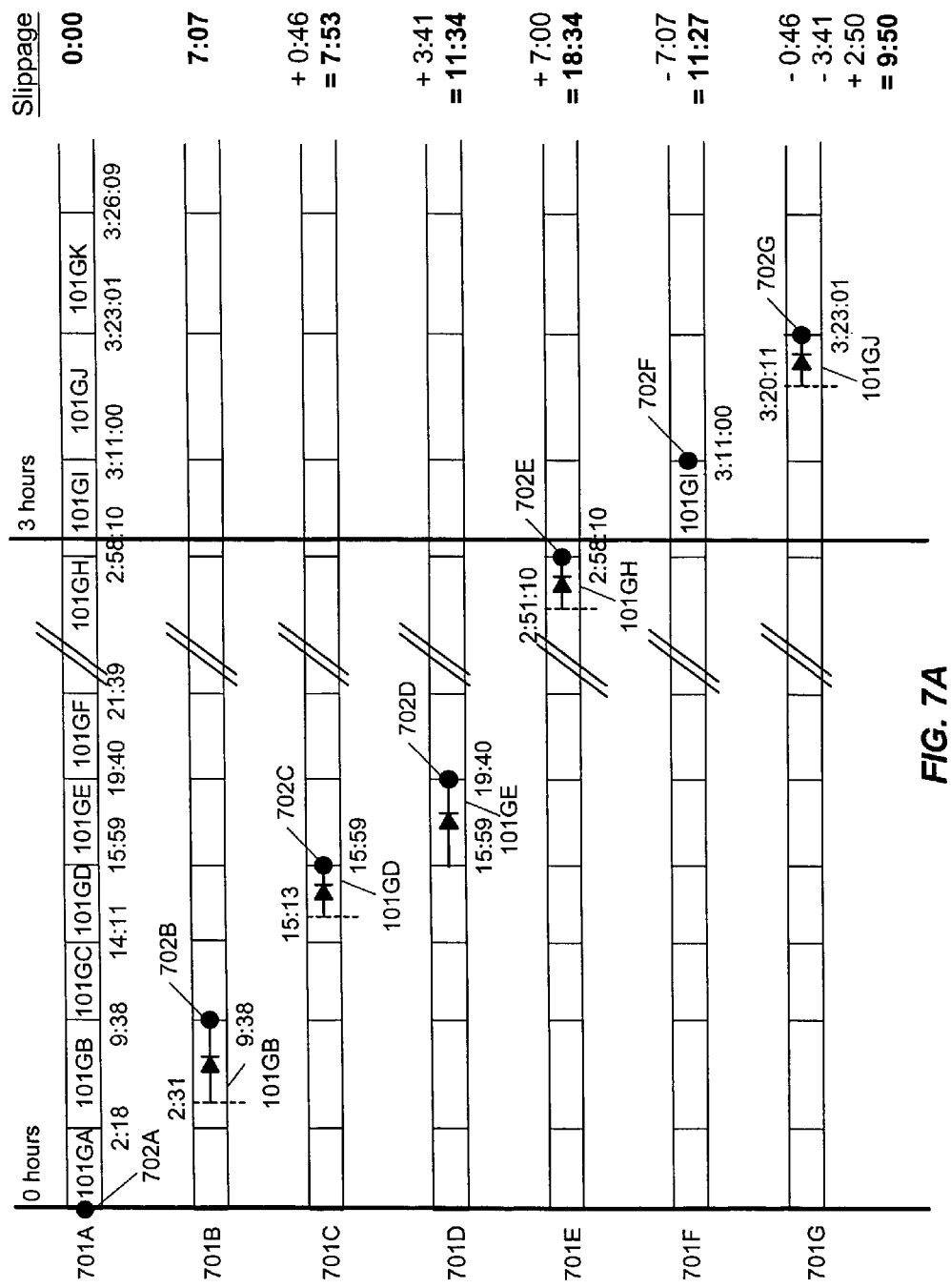
FIG. 7A depicts an example of tracking slippage for a sequence of songs, in response to the user skipping songs.

Referring now to FIG. 7A, there is shown an example of tracking slippage according to one embodiment of the present invention, in response to the user skipping some songs. Playlist 701 contains a number of songs 101GA through 101GK having various lengths. Playlist 701 is depicted in FIG. 7A at seven points in time, labeled 701A through 701G. For each point in time, an indicator 702A through 702G shows the point in the corresponding playlist 701 that is being played. For purposes of clarity, songs 101GA through 101GK are labeled in 701A but not in 701B through 701G.

In 701A, indicator 702A is at the beginning of the playlist. Slippage is initialized at 0:00.

In 701B, 2:31 into the playlist, during playback of song 101GB, the user requests a song skip. This song skip may be activated, for example, by the user clicking on an on-screen button or icon representing a song skip. Player 305 advances to the beginning of next song 101GC, which corresponds to a point 9:38 into the playlist. Since 7:07 of the playlist have been skipped, slippage is incremented to 7:07.

In 701C, 15:13 into the playlist, during playback of song 101GD, the user requests another song skip. Player 305 advances to the beginning of next song 101GE, which corresponds to a point 15:59 into the playlist. Since 0:46 of the playlist have been skipped, 0:46 is added to the slippage quantity, for a running total of 7:53.

In 701D, the user requests that song 101GE be skipped in its entirety. Player 305 advances to the beginning of next song 101GF, which corresponds to a point 19:40 into the playlist. Since 3:41 of the playlist have been skipped (corresponding to the length of song 101GE), 3:41 is added to the slippage quantity, for a running total of 11:34.

In 701E, 2:51:10 into the playlist, during playback of song 101GH, the user requests another song skip. Player 305 advances to the beginning of next song 101GI, which corresponds to a point 2:58:10 into the playlist. Since 7:00 of the playlist have been skipped, 7:00 is added to the slippage quantity, for a running total of 18:34.

In 701F, 3:11:00 into the playlist, over three hours have elapsed since 701B, so the time skipped in 701B is now outside the three-hour window specified by the DMCA. Accordingly, slippage is reduced by 7:07, which corresponds to the time skipped in 701B. In one embodiment, the amount by which to reduce slippage and the time at which to do so is determined by keeping track of previous skips. Reducing the slippage total by 7:07 yields 11:27 as the current slippage value. In one embodiment, the invention checks for slippage "expiry" at the end of each song; in another embodiment, the invention periodically makes such checks; in a third embodiment, the invention checks for slippage expiry when the slippage amount is about to be increased due to another skip request by the user; in a fourth embodiment, the difference in accumulated slippage between the current time and a point in time three hours ago is used to compute slippage during the intervening time period.

In 701G, 3:20:11 into the playlist, over three hours have elapsed since 701D, so the time skipped in 701C and 701D is now outside the three-hour window specified by the DMCA. Accordingly, slippage is reduced by 0:46, which corresponds to the time skipped in 701C, and by an additional 3:41, which corresponds to the time skipped in 701D. In addition, in 701G, during playback of song 101GJ, the user requests another song skip. Player 305 advances to the beginning of next song 101GK, which corresponds to a point 3:23:01 into the playlist. Since 2:50 of the playlist have been skipped, 2:50 is added to the slippage quantity. The subtraction of 0:46 and 3:41, plus the addition of 2:50, results in a running total of 9:50.

Figure 7B:
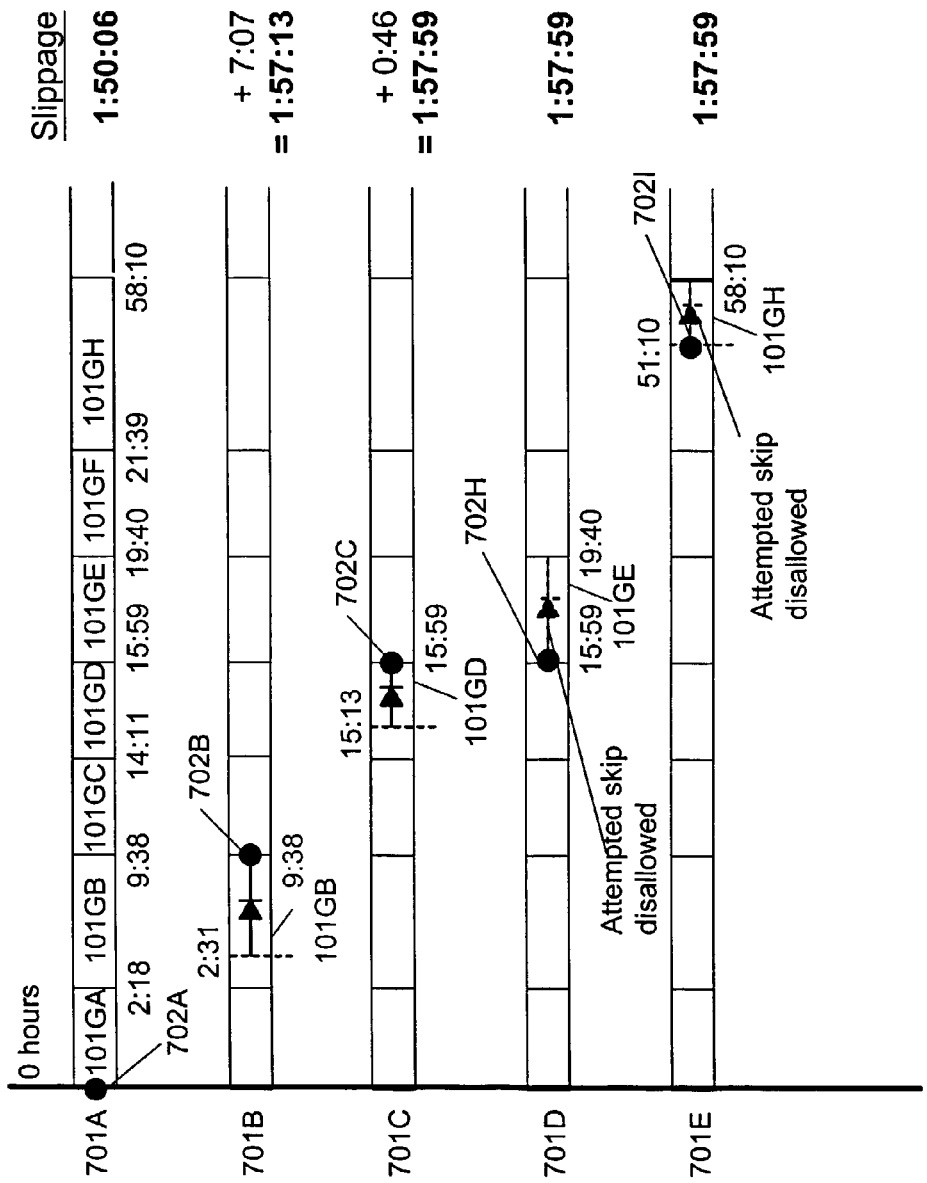
FIG. 7B depicts an example of tracking slippage for a sequence of songs, in response to the user skipping songs, wherein two attempted skips are disallowed.

Referring now to FIG. 7B, there is shown another example of tracking slippage according to one embodiment of the present invention, in response to the user skipping some songs. In this example, the invention disallows some of the user's skip requests once the maximum slippage quantity of 2:00:00 (two hours) has been reached.

For illustrative purposes, in FIG. 7B, slippage is considered to begin at a value of 1:50:06. Thus, it is assumed that 1:50:06 has already been skipped by the user prior to the point marked 0:00 in playlist 701A.

In 701B, 2:31 into the playlist, during playback of song 101GB, the user requests a song skip. Player 305 advances to the beginning of next song 101GC, which corresponds to a point 9:38 into the playlist. Since 7:07 of the playlist have been skipped, slippage is incremented to 7:07, for a running total of 1:57:13.

In 701C, 15:13 into the playlist, during playback of song 101GD, the user requests another song skip. Player 305 advances to the beginning of next song 101GE, which corresponds to a point 15:59 into the playlist. Since 0:46 of the playlist have been skipped, 0:46 is added to the slippage quantity, for a running total of 1:57:59.

In 701D, the user requests that song 101GE be skipped in its entirety. Song 101GE is 3:41 long. Skipping song 101GE would cause slippage to increase to 2:01:40. Since this would exceed the permissible limit of 2:00:00, and would therefore potentially result in a DMCA violation, the user's requested skip is disallowed. In one embodiment, the icon or button for skipping songs is "grayed out" or otherwise indicated as disabled, whenever a song skip would result in excess slippage. At any rate, the invention continues playing song 101GE and ignores the user's request. The slippage value remains unchanged at 1:57:59.

Similarly, in 701E, when the user requests that part of song 101GH be skipped, which would result in an increase of the slippage value to 2:04:59, the user's requested skip is disallowed. In one embodiment, the request is disallowed whenever skipping the entire song would result in excess slippage, even if the user's request is to skip only a portion of the song that would not in itself result in excess slippage. In another embodiment, a skip request is allowed as long as the skipped portion itself does not result in excess slippage. In yet another embodiment, a portion of the skip request may be allowed, so that player 305 carries out the skip as far as possible without exceeding total slippage limits.

Figure 7C:
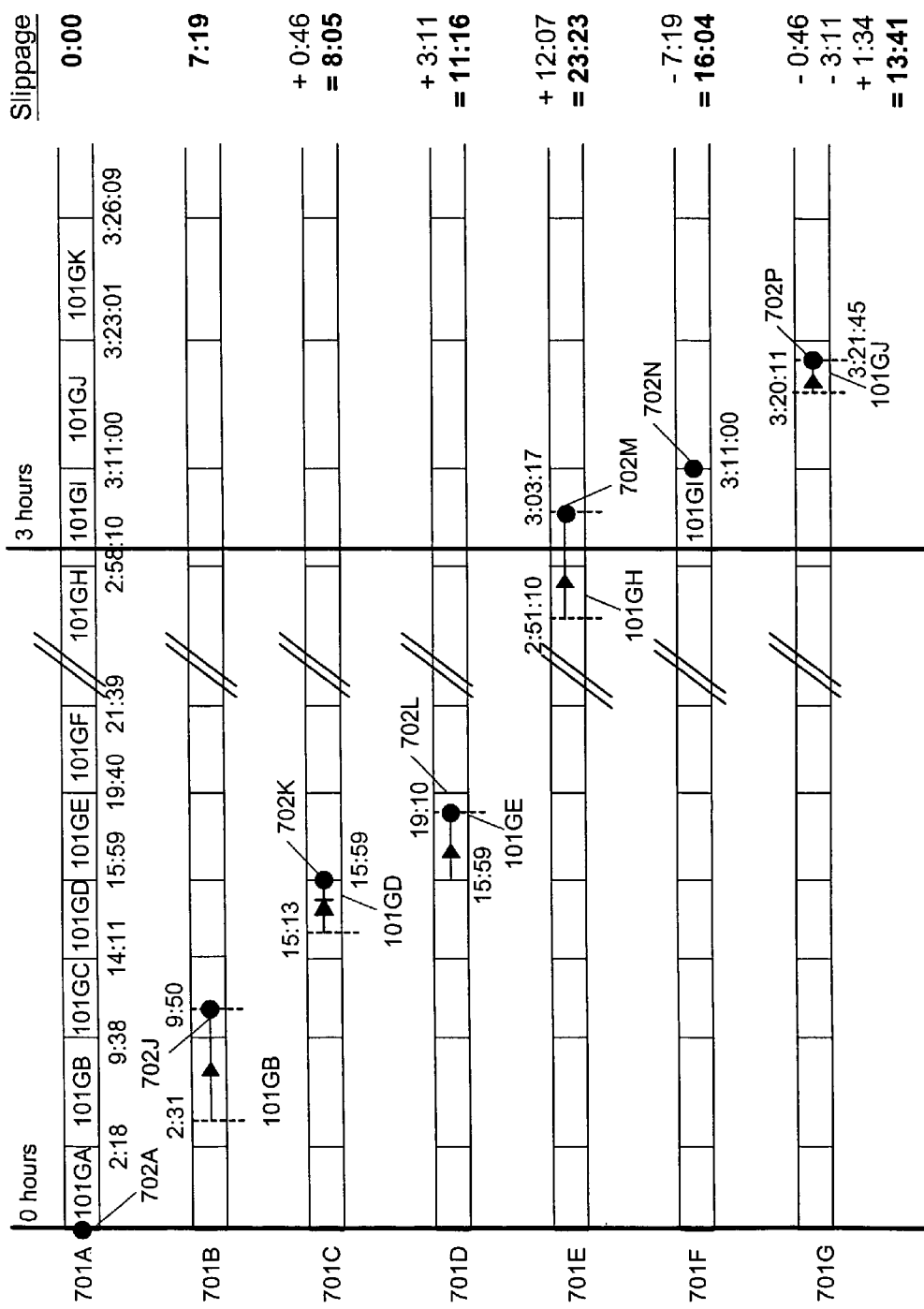
FIG. 7C depicts an example of tracking slippage for a sequence of songs, in response to the user fast-forwarding through songs.

Referring now to FIG. 7C, there is shown an example of tracking slippage according to one embodiment of the present invention, in response to the user fast-forwarding through songs. Thus, in this example, the user fast-forwards, or scans, through portions of songs and does not always skip forward to the beginning of the next song. Such fast-forwarding is well known in the operation of compact disc players and music player 305 software. Typically, fast-forwarding is implemented by speeding up playback of the music being skipped over, so that the user can hear an abbreviated version of the music and thereby determine when he or she wishes to resume normal play. For illustrative purposes, the example of FIG. 7C ignores the elapsed time for fast-forward operations. In an alternative embodiment, the invention reduces slippage amounts by the length of time taken by the fast-forwarding operation. For example, if it takes ten seconds to skip forward 7:19, in the alternative embodiment slippage would be increased by 7:09 rather than by 7:19.

In 701A, indicator 702A is at the beginning of the playlist. Slippage is initialized at 0:00.

In 701B, 2:31 into the playlist, during playback of song 101GB, the user fast-forwards to a point in song 101GC that is 9:50 into the playlist. This fast-forward operation may be activated, for example, by the user clicking or holding down an on-screen button or icon representing fast-forward, and clicking again or releasing the button or icon when he or she wishes to resume normal playback. Player 305 advances to the specified point 9:50 into the playlist. Since 7:19 of the playlist have been skipped, slippage is incremented to 7:19. As mentioned above, in an alternative embodiment, the amount of time taken to fast-forward would be subtracted from the 7:19.

In 701C, 15:13 into the playlist, during playback of song 101GD, the user requests a song skip. Player 305 advances to the beginning of next song 101GE, which corresponds to a point 15:59 into the playlist. Since 0:46 of the playlist have been skipped, 0:46 is added to the slippage quantity, for a running total of 8:05.

In 701D, 15:59 into the playlist at the beginning of playback of song 101GE, the user fast-forwards to a point in song 101GE that is 19:10 into the playlist. Player 305 advances to the specified point 19:10 into the playlist. Since 3:11 of the playlist have been skipped, slippage is incremented to 11:16.

In 701E, 2:51:10 into the playlist, during playback of song 101GH, the user fast-forwards to a point in song 101GI that is 3:03:17 into the playlist. Player 305 advances to the specified point 3:03:17 into the playlist. Since 12:07 of the playlist have been skipped, slippage is incremented to 23:23.

In 701F, 3:11:00 into the playlist, over three hours have elapsed since 701B, so the time skipped in 701B is now outside the three-hour window specified by the DMCA. Accordingly, slippage is reduced by 7:19, which corresponds to the time skipped in 701B. Reducing the slippage total by 7:19 yields 16:04 as the current slippage value.

In 701G, 3:20:11 into the playlist, over three hours have elapsed since 701D, so the time skipped in 701C and 701D is now outside the three-hour window specified by the DMCA. Accordingly, slippage is reduced by 0:46, which corresponds to the time skipped in 701C, and by an additional 3:11, which corresponds to the time skipped in 701D. In addition, in 701G, during playback of song 101GJ, the user fast-forwards to a point in song 101GJ that is 3:21:45 into the playlist. Player 305 advances to the specified point 3:21:45 into the playlist. Since 1:34 of the playlist have been skipped, slippage is incremented to 13:41.

Figure 7D:
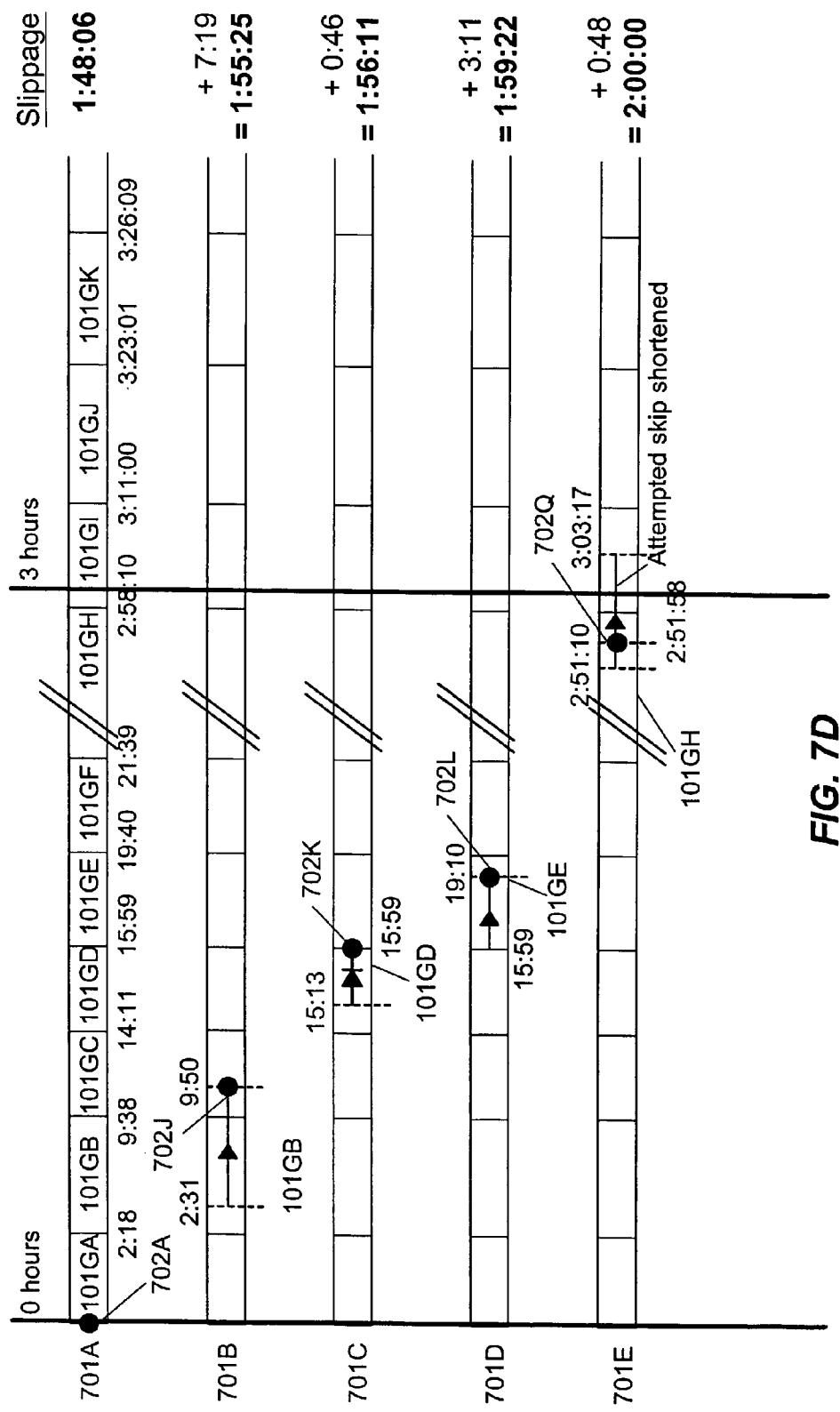
FIG. 7D depicts an example of tracking slippage for a sequence of songs, in response to the user fast-forwarding through songs, wherein an attempted skip is shortened.

Referring now to FIG. 7D, there is shown another example of tracking slippage according to one embodiment of the present invention, in response to the user fast-forwarding through some songs. In this example, as in FIG. 7B, the invention disallows some of the user's skip requests once the maximum slippage quantity of 2:00:00 (two hours) has been reached.

For illustrative purposes, in FIG. 7D, slippage is considered to begin at a value of 1:48:06. Thus, it is assumed that 1:48:06 has already been skipped by the user prior to the point marked 0:00 in playlist 701A.

In 701B, 2:31 into the playlist, during playback of song 101GB, the user fast-forwards to a point in song 101GC that is 9:50 into the playlist. Player 305 advances to the specified point 9:50 into the playlist. Since 7:19 of the playlist have been skipped, slippage is incremented to 1:55:25.

In 701C, 15:13 into the playlist, during playback of song 101GD, the user requests a song skip. Player 305 advances to the beginning of next song 101GE, which corresponds to a point 15:59 into the playlist. Since 0:46 of the playlist have been skipped, 0:46 is added to the slippage quantity, for a running total of 1:56:11.

In 701D, 15:59 into the playlist at the beginning of playback of song 101GE, the user fast-forwards to a point in song 101GE that is 19:10 into the playlist. Player 305 advances to the specified point 19:10 into the playlist. Since 3:11 of the playlist have been skipped, slippage is incremented to 1:59:22.

In 701E, 2:51:10 into the playlist, during playback of song 101GH, the user attempts to fast-forward to a point in song 101GI that is 3:03:17 into the playlist. Such an operation would result in excess slippage, since the skip of 12:07 added to the current slippage value of 1:59:22 results in a total of 2:11:29. In one embodiment, the requested skip is carried out only to the extent that it complies with the limit on slippage. Thus, player 305 fast-forwards by 0:48 and total slippage is incremented to 2:00:00. Further fast-forwarding is disabled, at least until slippage falls below 2:00:00. In another embodiment, when the user requests a fast-forward operation that would exceed allowable slippage, no fast-forwarding is performed, and the user's request is ignored. Player 305 advances to the specified point 3:03:17 into the playlist. Since 12:07 of the playlist have been skipped, slippage is incremented to 23:23.

The above-described examples illustrate the operation of the invention in several embodiments, in response to both song-skipping and fast-forwarding operations. They further illustrate the technique by which the present invention disallows or shortens skips when total slippage limits have been reached.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method comprising:
    transmitting at least one media item to a client;
    receiving, from the client, a signal indicating a request to skip a playback time remaining for a media item, the skip having a length representing the playback time remaining for the media item;
    selectively limiting, by a processor, skipping during playback comprising:
        determining, by the processor, whether adding the length of the requested skip to a current slippage value representing an aggregate playback time previously skipped would exceed a predetermined maximum slippage value representing a maximum time allowable for playback slippage;
        allowing, by the processor, the requested skip in a case that said determining makes a determination that adding the length of the requested skip to the current slippage value would not exceed the predetermined maximum slippage value.

2. The method of claim 1, further comprising, responsive to a determination that adding the length of the requested skip to the current slippage value would not exceed the predetermined maximum slippage value, updating the current slippage value to reflect the requested skip.

3. The method of claim 1, further comprising, responsive to a determination that adding the length of the requested skip to the current slippage value would not exceed the predetermined maximum slippage value, adding the length of the requested skip to the current slippage value.

4. The method of claim 1, wherein allowing the requested skip comprises transmitting to the client a portion of the media item following the skipped portion of the media item.

5. The method of claim 1, wherein allowing the requested skip comprises transmitting to the client a subsequent media item following the skipped media item.

6. A system comprising:
    at least one computing system each comprising at least one processor,
        the at least one computing system operating as:
            a skip request receiver for receiving user input requesting to skip a playback time remaining for a media item, the skip having a length representing the playback time remaining for the media item;

a slippage tracker, coupled to the skip request receiver, for determining whether adding the length of the requested skip to a current slippage value representing an aggregate playback time previously skipped would exceed a predetermined maximum slippage value representing a maximum time allowable for playback slippage; and a skip control module, operative with the slippage tracker to selectively limit skipping during media playback, the skip control module allowing the requested skip in a case that the slippage tracker makes a determination that adding the length of the requested skip to the current slippage value would not exceed the predetermined maximum slippage value.

7. The system of claim 6, wherein, responsive to a determination that adding the length of the requested skip to the current slippage value would not exceed the predetermined maximum slippage value, the slippage tracker updates the current slippage value to reflect the requested skip.

8. The system of claim 6, wherein, responsive to a determination that adding the length of the requested skip to the current slippage value would not exceed the predetermined maximum slippage value, the slippage tracker adds the length of the requested skip to the current slippage value.

9. The system of claim 6, wherein the at least one computing system further operating as:

a media output device, coupled to the skip control module, for, responsive to the skip control module allowing the requested skip, skipping the requested at least one portion of the media item.

10. The system of claim 6, wherein the at least one computing system further operating as:

a media stream requester, coupled to the skip control module, for, responsive to the skip control module allowing the requested skip, requesting from a server a portion of the media item following the skipped portion of the media item.

11. The system of claim 6, wherein the at least one computing system further operating as:

a media stream requester, coupled to the skip control module, for, responsive to the skip control module allowing the requested skip, requesting from a server a subsequent media item following the skipped media item.

12. The system of claim 6, wherein, responsive to a determination that adding the length of the requested skip to the current slippage value would exceed the predetermined maximum slippage value, the skip control module denies the requested skip.

13. The system of claim 6, wherein the slippage tracker subtracts the added length from the slippage value after a predetermined time period has elapsed since adding the length.

14. The system of claim 13, wherein the predetermined time period is three hours.

15. The system of claim 6, wherein the media item comprises a song performed by an artist.

16. The system of claim 6, wherein the media item comprises an audio item.

17. The system of claim 6, wherein the media item comprises a video item.

18. The system of claim 6, wherein the at least one computing system further operating as:

a media output device, coupled to the skip control module, for, outputting at least one media item.

19. The system of claim 18, wherein the at least one computing system further operating as:

a network interface, coupled to the media output device, for receiving at least one media item from a server.

20. The system of claim 19, wherein the media output device receives the at least one media item in a streaming format.

21. The system of claim 19, wherein the network interface receives the at least one media item across a network.

22. The system of claim 21, wherein the network comprises the Internet.

23. The system of claim 6, wherein the at least one computing system further operating as:

a server interface, coupled to the slippage tracker, for receiving, from a server, an estimated maximum skipping amount for a media item; and wherein the slippage tracker determines whether a cumulative skipped amount for the media item, including the requested skip, would exceed the estimated maximum skipping amount.

24. The system of claim 6, wherein the at least one computing system further operating as:

a server interface, coupled to the slippage tracker, for receiving, from a server, an estimated maximum skipping amount for a block of media items;

and wherein the slippage tracker determines whether a cumulative skipped amount for the block of media items, including the requested skip, would exceed the estimated maximum skipping amount.

25. The system of claim 6, wherein the requested skip comprises a skip of a media item associated with an artist.

26. The system of claim 6, wherein the requested skip comprises a skip of a portion of a media item associated with an artist.

27. A system comprising:

at least one computing system each having at least one processor, the at least one computing system operating as:

a user input receiving device, for receiving input requesting to skip a playback time remaining for of a media item, the skip having a length representing the playback time remaining for the media item;

a slippage tracker, coupled to the user input receiving device, for determining whether adding the length of the requested skip to a current slippage value representing an aggregate playback time previously skipped would exceed a predetermined maximum slippage value representing a maximum time allowable for playback slippage; and a media output device, operative with the slippage tracker to selectively limit skipping during media playback, the media output device executing the requested skip in a case that the slippage tracker makes a determination that adding the length of the requested skip to the current slippage value would not exceed the predetermined maximum slippage value.

28. The system of claim 27, wherein, responsive to a determination that adding the length of the requested skip to the current slippage value would exceed the predetermined maximum slippage value, the media output device skips a subportion of the requested at least one portion of the media item, the subportion having a length that, when added to the current slippage value does not exceed the predetermined maximum slippage value.

29. A system comprising:
at least one computing system each having at least one processors,
the at least one computing system operating as:
a user input receiver, for receiving user input requesting to skip a playback time remaining for a media item in a block that includes a plurality of media items, the skip having a length representing the playback time remaining for the media item;
a slippage tracker, coupled to the user input device, for determining whether adding the length of the requested skip to a current slippage value representing an aggregate playback time previously skipped would exceed a predetermined maximum slippage value representing a maximum time allowable for playback slippage; and
a skip control module, operative with the slippage tracker to selectively limit skipping during media playback of the block, the skip control module allowing the requested skip in a case that the slippage tracker makes a determination that adding the length of the requested skip to the current slippage value would not exceed the predetermined maximum slippage value;
wherein, upon conclusion of media playback of the block, the slippage tracker determines a new slippage value.

30. A system comprising:
at least one computing system each having at least one processors,
the at least one computing system operating as:
a media item transmission channel, for transmitting at least one media item to a client;
a network interface, coupled to the media item transmission channel, for, receiving, from the client, a signal indicating a request to skip playback time remaining for a media item, the skip having a length representing the playback time remaining for the media item;
a skip control module, coupled to the network interface, operative to selectively limit skipping during media playback, the skip control module:
determining whether adding the length of the requested skip to a current slippage value representing an aggregate playback time previously skipped would exceed a predetermined maximum slippage value representing a maximum time allowable for playback slippage; and
allowing the requested skip in a case that a determination is made that adding the length of the requested skip to the current slippage value would not exceed the predetermined maximum slippage value, such that the network interface transmits, to the client, a command allowing the requested skip.

31. The system of claim 30, wherein, responsive to a determination that adding the length of the requested skip to the current slippage value would not exceed the predetermined maximum slippage value, the skip control module updates the current slippage value to reflect the requested skip.

32. The system of claim 30, wherein, responsive to a determination that adding the length of the requested skip to the current slippage value would not exceed the predetermined maximum slippage value, the skip control module adds the length of the requested skip to the current slippage value.

33. The system of claim 30, wherein, responsive to a determination that adding the length of the requested skip to the current slippage value would not exceed the predetermined maximum slippage value, the media item transmission channel transmits to the client a portion of the media item following the skipped portion of the media item.

34. The system of claim 30, wherein, responsive to a determination that adding the length of the requested skip to the current slippage value would not exceed the predetermined maximum slippage value, the media item transmission channel transmits to the client a subsequent media item following the skipped media item.

35. A computer program product comprising a computer-readable storage medium tangibly storing program code embodied thereon comprising:
program code to transmit at least one media item to a client;
program code to receive, from the client, a signal indicating a request to skip a playback time remaining for a media item, the skip having a length representing the playback time remaining for the media item;
program code to selectively limit skipping during playback comprising:
program code to determine whether adding the length of the requested skip to a current slippage value representing an aggregate playback time previously skipped would exceed a predetermined maximum slippage value representing a maximum time allowable for playback slippage; and
program code to allow the requested skip in a case that a determination is made that adding the length of the requested skip to the current slippage value would not exceed the predetermined maximum slippage value.

36. The computer program product of claim 35, further comprising program code, responsive to a determination that adding the length of the requested skip to the current slippage value would not exceed the predetermined maximum slippage value, to update the current slippage value to reflect the requested skip.

37. The computer program product of claim 35, further comprising program code, responsive to a determination that adding the length of the requested skip to the current slippage value would not exceed the predetermined maximum slippage value, to add the length of the requested skip to the current slippage value.

38. The computer program product of claim 35, wherein the program code to allow the requested skip comprises program code to transmit to the client a portion of the media item following the skipped portion of the media item.

39. The computer program product of claim 35, wherein the program code to allow the requested skip comprises program code to transmit to the client a subsequent media item following the skipped media item.

* * * * *